(12) United States Patent
Mizoguchi et al.

(10) Patent No.: US 11,579,654 B2
(45) Date of Patent: Feb. 14, 2023

(54) PORTABLE INFORMATION DEVICE

(71) Applicant: LENOVO (SINGAPORE) PTE. LTD., Singapore (SG)

(72) Inventors: Fumitake Mizoguchi, Kanagawa (JP); Takehito Yamauchi, Kanagawa (JP); Tatsuya Ushioda, Kanagawa (JP); Hiroaki Kinoshita, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 17/084,090

(22) Filed: Oct. 29, 2020

(65) Prior Publication Data
US 2021/0124397 A1   Apr. 29, 2021

(30) Foreign Application Priority Data

Oct. 29, 2019 (JP) .............................. JP2019-195956

(51) Int. Cl.
*G06F 1/16* (2006.01)

(52) U.S. Cl.
CPC .......... *G06F 1/1641* (2013.01); *G06F 1/1616* (2013.01); *G06F 1/1679* (2013.01); *G06F 1/1681* (2013.01)

(58) Field of Classification Search
CPC .... G06F 1/1641; G06F 1/1616; G06F 1/1679; G06F 1/1681; G06F 1/1652; G06F 1/1637

See application file for complete search history.

(56) References Cited

U.S. PATENT DOCUMENTS

| 10,067,536 | B1 * | 9/2018 | Watamura | G06F 1/1652 |
| 10,198,041 | B2 * | 2/2019 | Myeong | G06F 1/1681 |
| 10,817,030 | B2 * | 10/2020 | Pelissier | G06F 1/1652 |
| 10,838,457 | B2 * | 11/2020 | Yu | G06F 1/1652 |
| 11,074,836 | B2 * | 7/2021 | Shin | G09F 9/301 |

(Continued)

FOREIGN PATENT DOCUMENTS

| JP | 2005-166634 | 6/2005 |
| JP | 2009-198633 | 9/2009 |

(Continued)

*Primary Examiner* — Rockshana D Chowdhury
(74) *Attorney, Agent, or Firm* — Antony P. Ng; Russell Ng PLLC

(57) ABSTRACT

A portable information device capable of supporting a display is described. The portable information device includes a first chassis member and a second chassis member connected mutually rotatable, a first support plate that supports a display on the side of the first chassis member, a second support plate that supports the display on the side of the second chassis member, a first locking member including a first fixing portion to be fixed to the rear face of the first support plate with adhesive, and a first locking piece projecting from one end face of the first support plate, the first locking piece being configured to come in contact with and separate from the rear face of the second support plate. The first support plate includes a first contact face with which the first locking member comes in contact and a first adhesive face that fixes the first locking member with the adhesive. The first adhesive face is recessed from the first contact face by a thickness of the adhesive.

9 Claims, 17 Drawing Sheets

(56) References Cited

U.S. PATENT DOCUMENTS

| | | | |
|---|---|---|---|
| 2013/0021762 A1 | 1/2013 | van Dijk et al. | |
| 2014/0355195 A1* | 12/2014 | Kee | H04M 1/0268 361/679.27 |
| 2015/0055287 A1* | 2/2015 | Seo | G06F 1/1641 361/679.27 |
| 2018/0107250 A1* | 4/2018 | Cho | G09F 9/301 |
| 2018/0335679 A1 | 11/2018 | Hashimoto et al. | |

FOREIGN PATENT DOCUMENTS

| | | |
|---|---|---|
| JP | 2017-044947 | 3/2017 |
| JP | 6453413 | 1/2019 |
| JP | 2019067279 A | 4/2019 |

* cited by examiner

PORTABLE INFORMATION DEVICE

PRIORITY CLAIM

The present application claims benefit of priority under 35 U.S.C. §§ 120, 365 to the previously filed Japanese Patent Application No. JP2019-195956 with a priority date of Oct. 29, 2019, which is incorporated by reference herein.

TECHNICAL FIELD

The present invention relates to portable information devices in general, and in particular to a portable information device having a first chassis member and a second chassis member rotatable connected to the first chassis member.

BACKGROUND

Portable information devices, such as tablet PCs and smart phones, which include a touch-panel liquid crystal display and do not have a physical keyboard have rapidly gain popularity. The display of this type of portable information device is intended to be large when being in use, but compact when being carried. To this end, a portable information device including a flexible display, such as an organic Electro Luminescence (EL), has been proposed, which includes not only the chassis but also the display that can be folded.

In addition, a portable information device may include two support plates that support the display on the inner face side of the two chassis members. These support plates have comb-teeth like locking pieces for locking between the support plates in order to suppress a level difference between the plates. Each of the locking pieces may be fixed to the corresponding support plate with an adhesive. In that case, the locking piece is displaced in the height direction from the surface of the support plate by the thickness of the adhesive, and as a result, a small gap is generated between the engaged support plates and a level difference may occur between the adjacent ends of the two support plates. This may cause waviness or bending of the display that is supported by these support plates.

Consequently, it would be desirable to provide a portable information device capable of supporting the display in a stable manner.

SUMMARY

In accordance with an embodiment of the present disclosure, a portable information device includes: a first chassis member; a second chassis member rotatably connected to the first chassis member; a display between inner faces of the first chassis member and the second chassis member; a first support plate disposed above the inner face of the first chassis member to support a rear face of the display on a side of the first chassis member; a second support plate disposed above the inner face of the second chassis member to support a rear face of the display on a side of the second chassis member; and a first locking member including a first fixing portion fixed to a rear face of the first support plate with an adhesive, and at least one first locking piece projecting from one end face of the first support plate, the at least one first locking piece being configured to come in contact with and separate from a rear face of the second support plate when the first and second chassis members are opened and closed. One of the first support plate and the first locking member includes a first contact face with which a part of the other comes in contact; and a first adhesive face to which a part of the other is fixed with the adhesive, the first adhesive face being recessed from the first contact face by a thickness of the adhesive.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Overall Configuration of Portable Information Device

Figure 1:
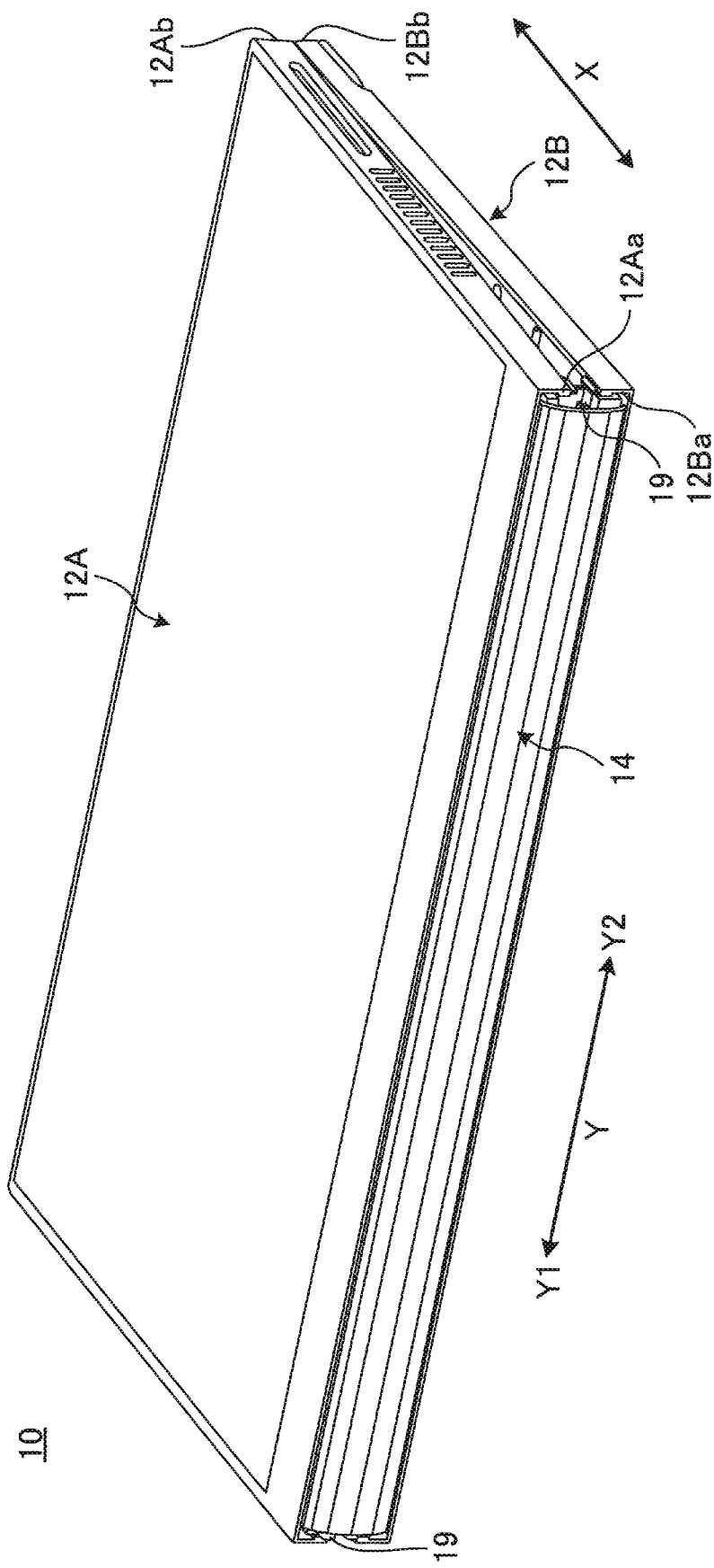
FIG. 1 is a perspective view of a portable information device that is shown closed, according to one embodiment.
Figure 2:
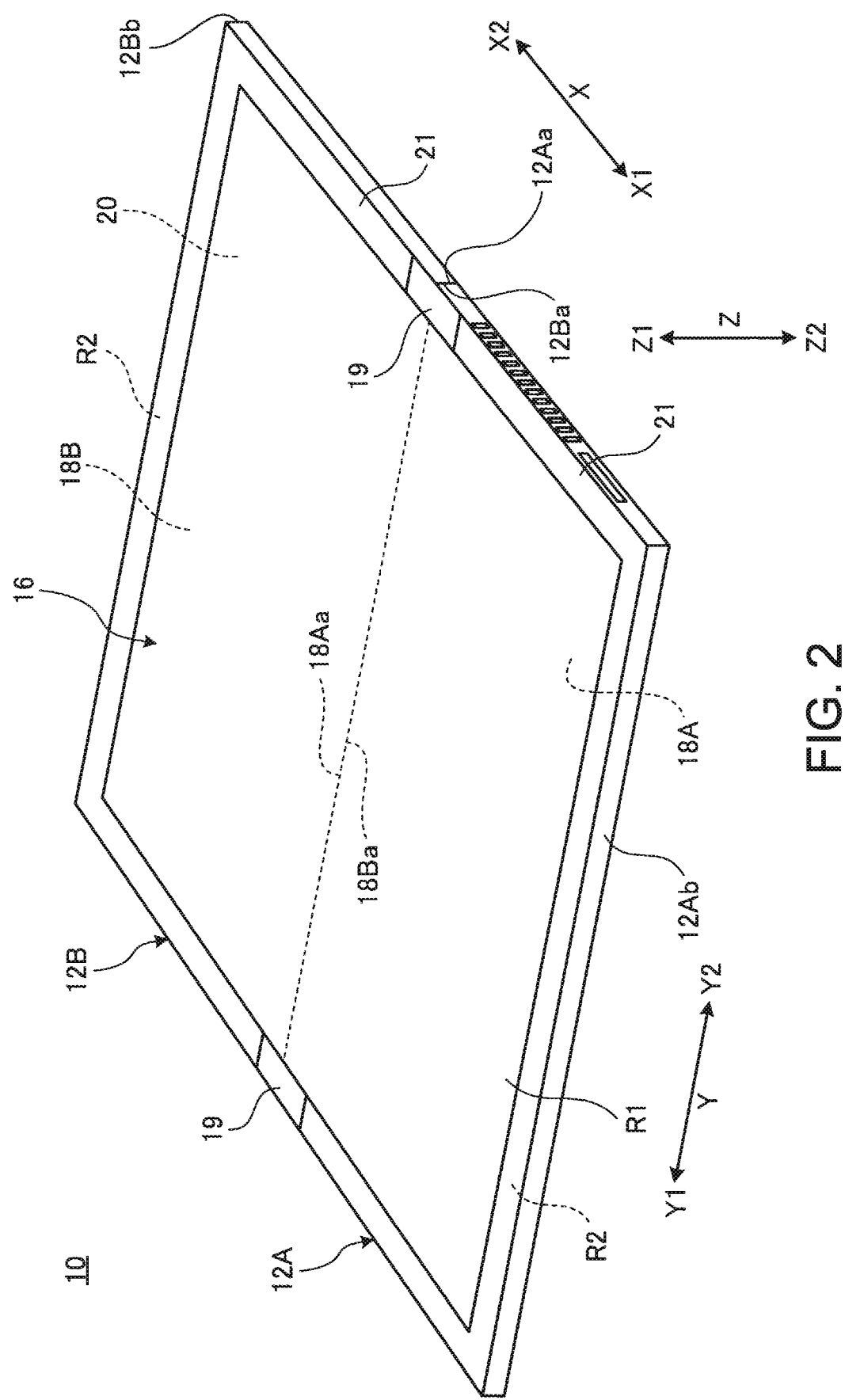
FIG. 2 is a perspective view of the portable information device of FIG. 1 that is shown opened.
Figure 3:
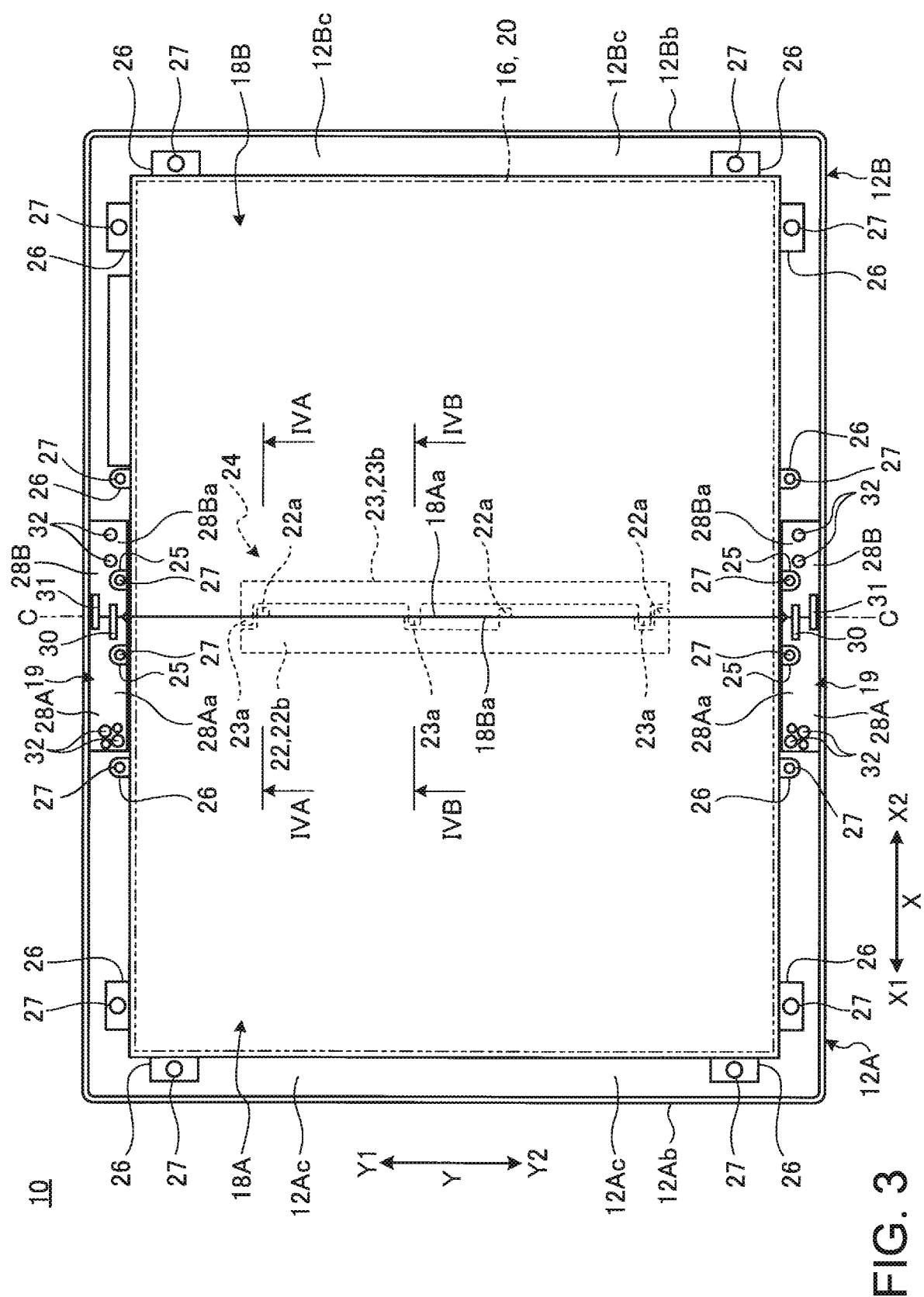
FIG. 3 is a plan view of the internal structure of the portable information device of FIG. 2.

FIG. 1 is a perspective view of a portable information device 10 that is shown closed in a storage mode, according to one embodiment. FIG. 2 is a perspective view of the portable information device 10 of FIG. 1 that is shown opened in a usage mode. FIG. 3 is a plan view of the internal structure of the portable information device 10 of FIG. 2.

As illustrated in FIG. 1 and FIG. 2, the portable information device 10 includes a first chassis member 12A, a second chassis member 12B, a backbone member 14, and a display 16. This embodiment describes a tablet PC that is foldable into half like a book as an example of the portable information device 10. Other examples of the portable information device 10 include a mobile phone, a smart phone, an electronic organizer, and a portable game machine.

The chassis members 12A and 12B each are rectangular plate members having three sides other than the side corresponding to the backbone member 14, and the three sides are raised to define side walls. In one example, the chassis members 12A and 12B are metal plates made of stainless steel, magnesium, and aluminum or fiber reinforced resin plates containing reinforcement fibers, such as carbon fibers. A display 16 is fixed on the inner face sides of the chassis members 12A and 12B via a first support plate 18A and a second support plate 18B. The portable information device 10 includes the single display 16, which is supported over a range from the first support plate 18A to the second support plate 18B. The chassis members 12A and 12B are connected to be mutually rotatable via a pair of hinge mechanisms 19 and 19 disposed at both ends of the backbone member 14. The hinge mechanisms 19 connect the chassis members 12A and 12B so as to be foldable between a storage mode illustrated in FIG. 1 and a usage mode illustrated in FIG. 2. A line C as a dot-dash line in FIG. 3 indicates a folding center C that is the center of the folding operation of the chassis members 12A and 12B.

Each of the chassis members 12A and 12B has an inner end face (one end face) 12Aa, 12Ba on the side of the backbone member 14 and an outer end face 12Ab, 12Bb on the side opposite to the backbone member 14. The inner end faces 12Aa and 12Ba are on the hinge side, and the outer end faces 12Ab and 12Bb are on the open end side.

Hereinafter, as illustrated in FIGS. 1 to 3, the direction from the central backbone member 14 to the outer end faces 12Ab, 12Bb of the portable information device 10 is called the X direction, and the longitudinal direction of the backbone member 14 is called the Y direction. For the X direction, the direction from the backbone member 14 toward the outer end face 12Ab may be called the X1 direction, and the direction toward the outer end face 12Bb may be called the X2 direction. Similarly for the Y direction, the direction toward one end (the upper end in FIG. 3) in the longitudinal direction of the backbone member 14 may be called the Y1 direction, and the direction toward the other end (the lower end in FIG. 3) may be called the Y2 direction. Referring to the usage mode illustrated in FIG. 2, the plate-like components of the portable information device 10 each have a surface directed along the arrow Z1, that is, toward the surface of the display 16, and a rear face directed along the opposite arrow Z2.

As illustrated in FIG. 2 and FIG. 3, the first support plate 18A is attached and fixed to an inner face 12Ac of the first chassis member 12A, and the second support plate 18B is attached and fixed to an inner face 12Bc of the second chassis member 12B. Various components, such as a board, a communication module, a battery device, and a cooling device, are attached and fixed at positions on the inner faces 12Ac and 12Bc of the chassis members 12A and 12B and on the rear face side of the support plates 18A and 18B.

In one example, the display 16 is a touch panel type liquid crystal display. The display 16 is configured so as to be foldable together with the chassis members 12A and 12B when the chassis members 12A and 12B are folded. The display 16 is attached and fixed on the side of the inner faces 12Ac and 12Bc of the chassis members 12A and 12B via the support plates 18A and 18B. In another example, the display 16 is a flexible display, such as an organic EL, having a paper structure with high flexibility, and is opened/closed with the chassis members 12A and 12B.

The backbone member 14 includes a thin plate-like member having flexibility and serves as the backbone when the portable information device 10 is folded. The backbone member 14 extends between the chassis members 12A and 12B so as to cover the inner end faces 12Aa and 12Ba from their inner side. As illustrated in FIG. 1, the inner end faces 12Aa and 12Ba of the chassis members 12A and 12B are separated largely from each other to have a gap when the portable information device 10 is in the storage mode. The backbone member 14 covers this gap between the inner end faces 12Aa and 12Ba to prevent the display 16 and various components inside from being exposed.

II. Support Plates

Figure 4A:
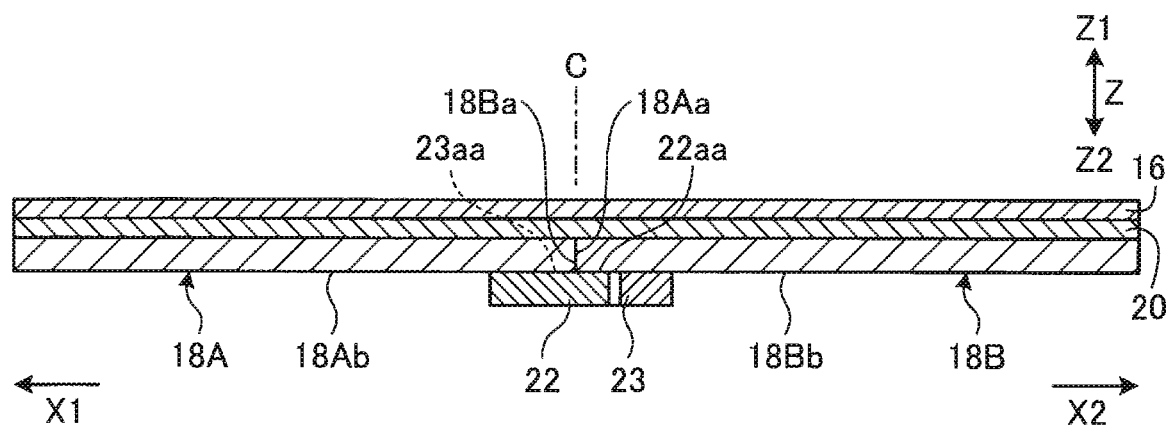
FIG. 4A is a cross-sectional view along the IVA-IVA line in FIG. 3.
Figure 4B:
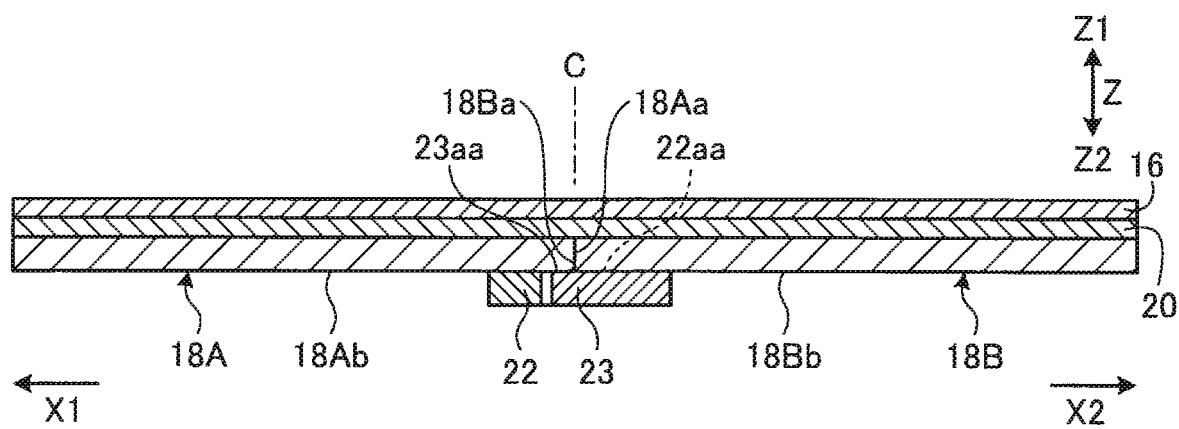
FIG. 4B is a cross-sectional view along the IVB-IVB line in FIG. 3.

The following describes an example of the configuration of the support plates 18A and 18B supporting the display 16. FIG. 4A is a cross-sectional view along the IVA-IVA line in FIG. 3. FIG. 4B is a cross-sectional view along the IVB-IVB line in FIG. 3.

As illustrated in FIG. 4A and FIG. 4B, the support plates 18A and 18B are plate members supporting the display 16 on their surface side. The support plates 18A and 18B are fixed to the inner faces 12Ac and 12Bc of the chassis members 12A and 12B, respectively, and are opened/closed like a book having the center at the folding center C. In an example of this embodiment, the support plates 18A and 18B support the display 16 via a sheet member 20.

In one example, the support plates 18A and 18B are metal plates made of metal, such as stainless steel, magnesium, and aluminum, or fiber reinforced resin plates including reinforcement fibers, such as carbon fibers, impregnated with a matrix resin including thermosetting resin or thermoplastic resin. In this embodiment, the support plates 18A and 18B are carbon fiber reinforced resin plates including carbon fibers for reinforcement. The same applies to a first locking member 22 and a second locking member 23 described later.

Figure 6A:
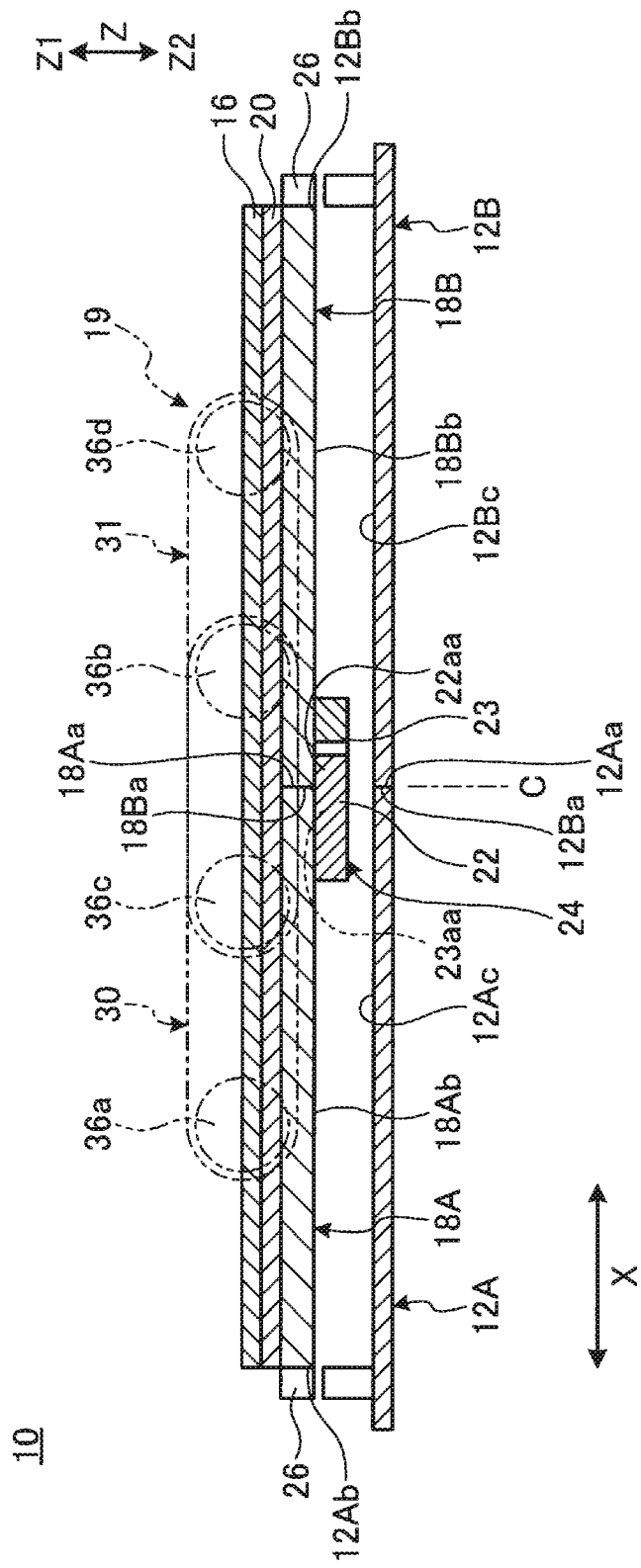
FIG. 6A is a side cross-sectional view of the positional relationship between the support plates and a hinge mechanism when chassis members are opened.

In the usage mode of opening the chassis members 12A and 12B like a flat plate, the support plates 18A and 18B of this embodiment have the adjacent inner end faces (one end face) 18Aa and 18Ba that abut on each other (see FIG. 4A and FIG. 6A). In the storage mode of folding the chassis members 12A and 12B double, the inner end faces 18Aa and 18Ba of the support plates 18A and 18B are separated from each other (see FIG. 6C).

The sheet member 20 is a thin film made of a flexible material, such as a thin resin film or metal foil. The sheet member 20 extends over the entire surface of the left and right support plates 18A and 18B. The rear face of the sheet member 20 adheres for fixing to the surfaces of the support plates 18A and 18B with adhesive, double-sided tape, or the like. The sheet member 20 has a non-adhesive part extending between the inner end faces 18Aa and 18Ba in the X direction (a belt-like portion having short sides in the X direction and long sides in the Y direction), and this non-adhesive part does not adhere to the surface of the support plates 18A and 18B (see FIG. 6C). This non-adhesive part of the sheet member 20 functions as a bending portion (flexible hinge) between the support plates 18A and 18B.

Almost the entire region of the rear face of the display 16 adheres for fixing to the surface of the sheet member 20 with adhesive, double-sided tape, or the like. As illustrated in FIG. 2, a bezel 21 is disposed on the outer peripheral edge of the surface of the display 16. The bezel 21 covers a non-display region (inactive region) R2 at the outer peripheral edge other than a display region (active region) R1 of the surface of the display 16. The display 16 may directly adhere for fixing to the surfaces of the support plates 18A and 18B without using the sheet member 20. In this configuration, a part of the display 16 extending between the inner end faces 18Aa and 18Ba in the X direction is a non-adhesive part that does not adhere to the support plates 18A and 18B.

As illustrated in FIG. 3, an end face positioning portion 24 having a first locking member 22 and a second locking member 23 is disposed across the inner end faces 18Aa and 18Ba of the support plates 18A and 18B.

Figure 5:
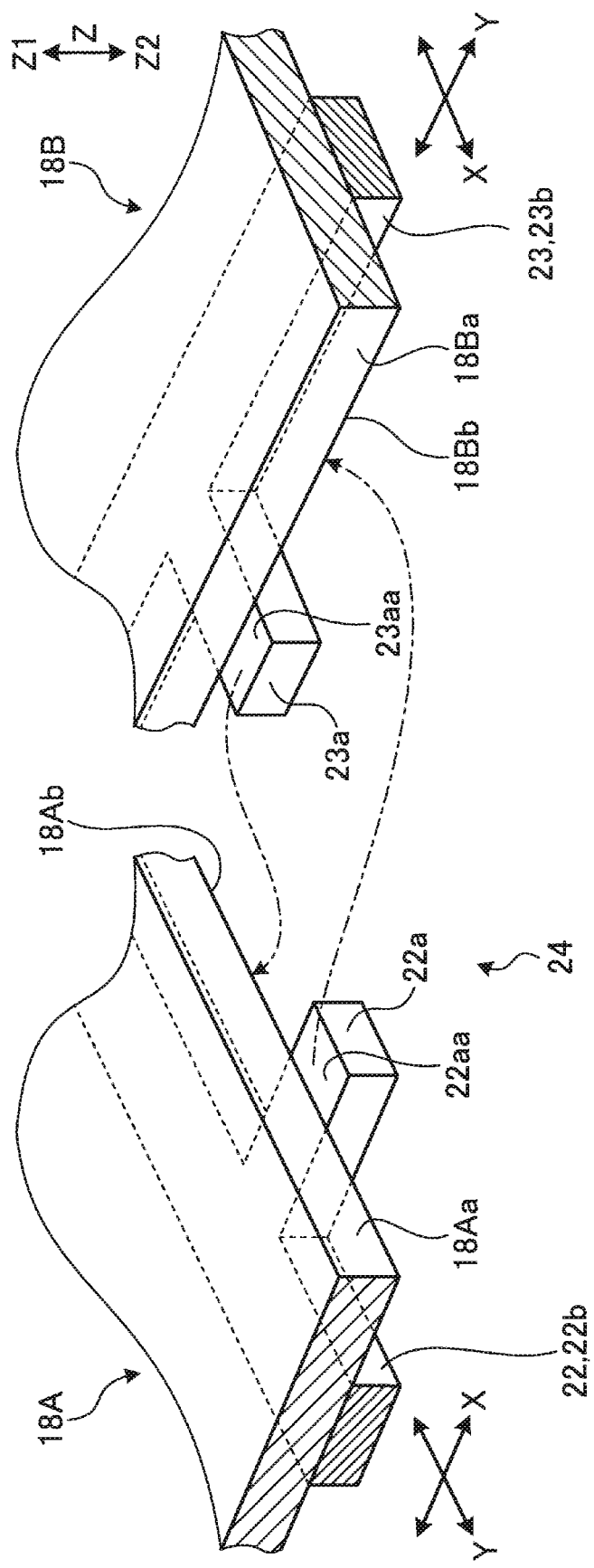
FIG. 5 is an enlarged perspective view of a major part of the configuration of an end face positioning portion.

FIG. 5 is an enlarged perspective view of a major part of the end face positioning portion 24. FIG. 5 is a view in which the inner end face 18Aa of the first support plate 18A and the inner end face 18Ba of the second support plate 18B are opened to have a fan shape for explanation.

As illustrated in FIG. 3 to FIG. 5, the first locking member 22 is a piece of plate fixed to the rear face 18Ab of the first support plate 18A. The first locking member 22 has a first fixing portion 22*b* extending in the Y direction and at least one first locking piece 22*a* protruding from the first fixing portion 22*b*. Multiple (three in FIG. 3) first locking pieces 22*a* are arranged along the inner end face 18Aa of the first support plate 18A. The first locking pieces 22*a* project from the inner end faces 18Aa, 18Ba in the X2 direction and extend to a position to abut on the rear face 18Bb of the second support plate 18B. When the chassis members 12A and 12B are opened/closed by the hinge mechanisms 19, the surface 22*aa* of each first locking piece 22*a* comes in contact with/separates from the rear face 18Bb of the second support plate 18B.

The second locking member 23 is a piece of plate fixed to the rear face 18Bb of the second support plate 18B. The second locking member 23 has a second fixing portion 23*b* extending in the Y direction and at least one second locking piece 23*a* protruding from the second fixing portion 23*b*. Multiple (three in FIG. 3) second locking pieces 23*a* are arranged along the inner end face 18Ba of the second support plate 18B, and each of the second locking piece 23*a* intervenes between the adjacent first locking pieces 22*a* and 22*a*. The second locking pieces 23*a* project from the inner end faces 18Ba, 18Aa in the X1 direction and extend to a position to abut on the rear face 18Ab of the first support plate 18A. When the chassis members 12A and 12B are opened/closed by the hinge mechanisms 19, the surface 23*aa* of each second locking piece 23*a* comes in contact with/separates from the rear surface 18Ab of the first support plate 18A.

In this way, the locking pieces 22*a* and 23*a* are disposed side by side in the Y direction and project in the X direction to be opposed, and this defines the structure to let the comb-teeth like pieces engage across the inner end faces 18Aa and 18Ba. The surfaces 22*aa* and 23*aa* of the locking pieces 22*a* and 23*a* come into contact with/separate from the rear faces 18Ab and 18Bb of the mating support plates 18A and 18B. The first locking member 22 and the second locking member 23 will be described later in details.

As illustrated in FIG. 3, the support plates 18A and 18B are attached for fixing to the inner faces 12Ac and 12Bc of the chassis members 12A and 12B via attachments 25 and 26 projecting from the outer peripheral edge. The attachments 25 and 26 project outwardly from the outer peripheral end faces of the support plates 18A and 18B. The attachments 25 are disposed at a position overlapping the hinge mechanisms 19. The attachments 26 are disposed at appropriate positions of the outer peripheral edge of the support plates 18A and 18B. The attachments 25, 26 each have a through-hole for screwing in the center. The support plates 18A and 18B are fastened for fixing to the inner faces 12Ac and 12Bc of the chassis members 12A and 12B with screws 27 passing through the through-holes of the attachments 25 and 26. The attachments 25 are fastened with the screws 27 to hinge chassis 28A and 28B described later so that the attachments 25 abut on the surfaces 28Aa and 28Ba of the hinge chassis 28A and 28B. On the inner faces 12Ac and 12Bc of the chassis members 12A and 12B, bosses may be disposed, and each boss may have a female thread for screwing with the screw 27.

Hinge Mechanism

The following describes an example of the configuration of the hinge mechanisms 19 connecting the chassis members 12A and 12B. The hinge mechanisms 19 may be a mono-axial hinge or a biaxial hinge, instead of a multi-axis hinge as in the following.

As illustrated in FIG. 3, the hinge mechanisms 19 are disposed on both ends in the Y direction while extending between the chassis members 12A and 12B. The hinge mechanisms 19 are disposed on the outside of the outer shape of the display 16 and are linearly symmetrical relative to the straight line along the X direction passing through the center in the Y direction. Each hinge mechanism 19 has a first hinge chassis 28A, a second hinge chassis 28B, a first link member 30, and a second link member 31.

The hinge chassis 28A and 28B are thin block-shaped components made of resin, metal, or the like. The first hinge chassis 28A is fixed to the inner face 12Ac of the first chassis member 12A using screws 32. The second hinge chassis 28B is fixed to the inner face 12Bc of the second chassis member 12B using screws 32.

One end of the first link member 30 is rotatably connected to the first hinge chassis 28A via a first hinge shaft 36*a*, and the other end is rotatably connected to the second hinge chassis 28B via a second hinge shaft 36*b* (see FIG. 6A). One end of the second link member 31 is rotatably connected to the first hinge chassis 28A via a third hinge shaft 36*c*, and the other end is rotatably connected to the second hinge chassis 28B via a fourth hinge shaft 36*d* (see FIG. 6A). The first link member 30 and the second link member 31 are disposed in parallel in the Y direction. The second hinge shaft 36*b* of the first link member 30 is located at a position between the third hinge shaft 36*c* and the fourth hinge shaft 36*d* of the second link member 31. The third hinge shaft 36*c* of the second link member 31 is located at a position between the first hinge shaft 36*a* and the second hinge shaft 36*b* of the first link member 30. The first link member 30 and the second link member 31 are therefore mutually displaced in the X direction and in the Y direction.

Figure 6B:
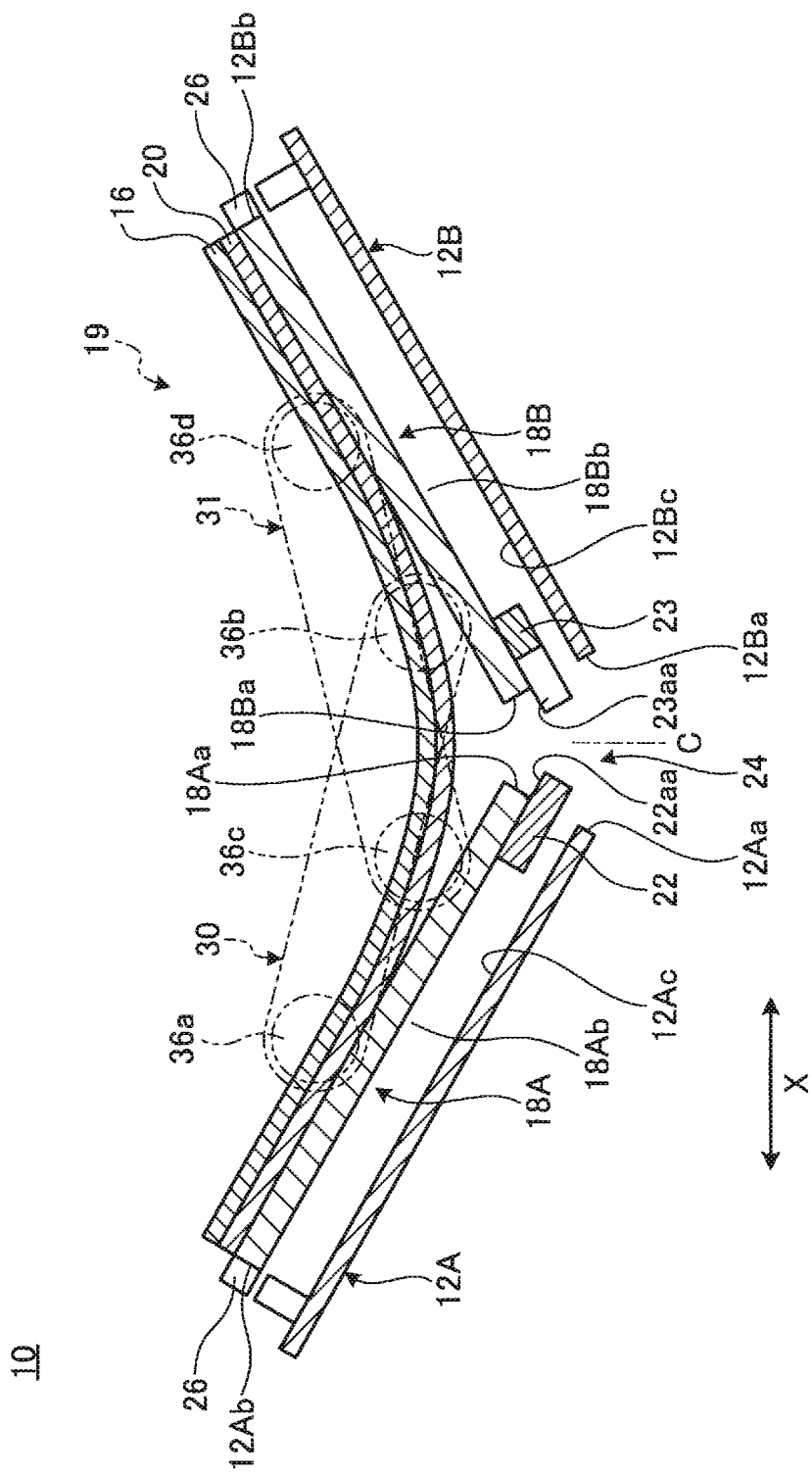
FIG. 6B is a side cross-sectional view of the portable information device during closing of the chassis members from the state of FIG. 6A.
Figure 6C:
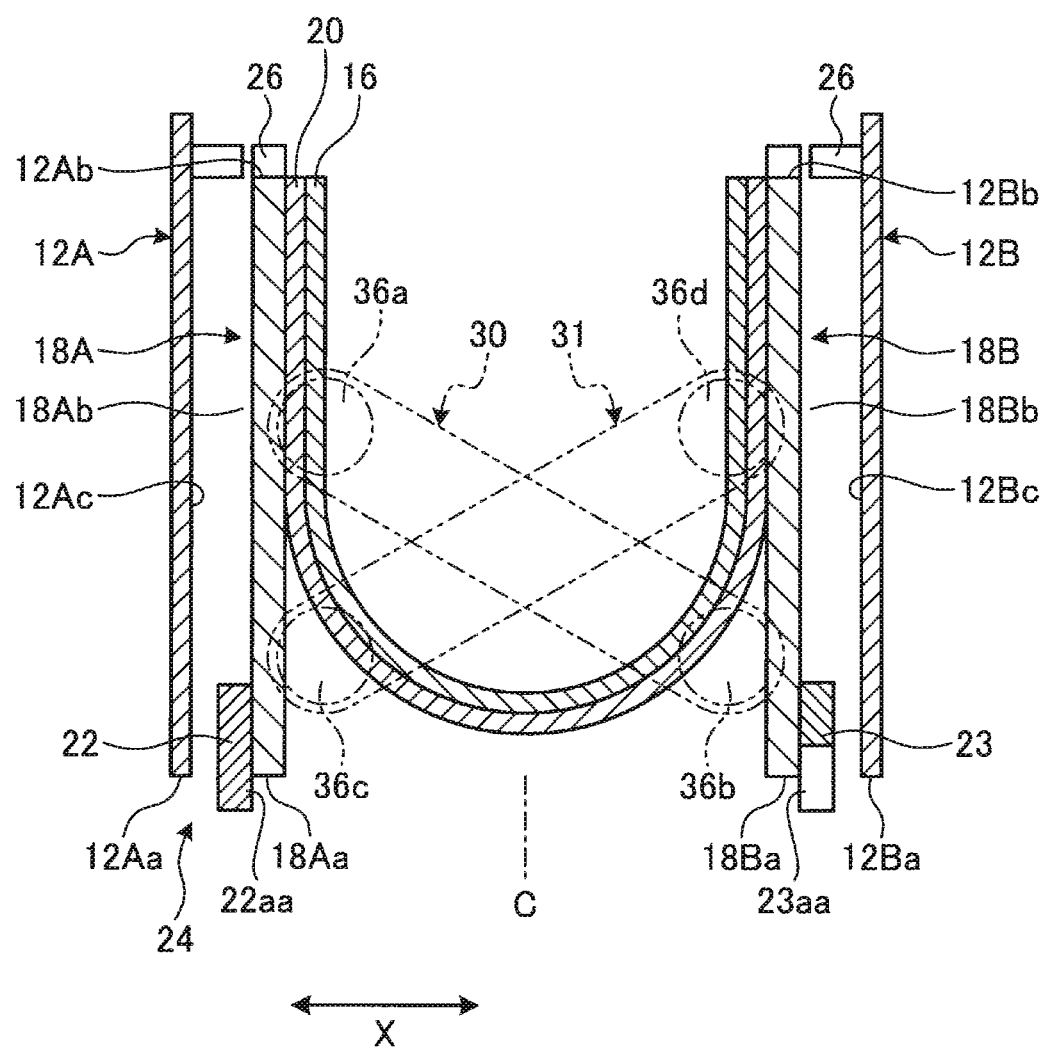
FIG. 6C is a side cross-sectional view of the portable information device after folding it double between the chassis members from the state of FIG. 6B.

When the chassis members 12A and 12B are folded at the folding center C, the link members 30 and 31 of each hinge mechanism 19 rotate via the hinge shafts 36a to 36d (FIGS. 6A to 6C). In this way, the hinge mechanisms 19 connect the chassis members 12A and 12B so as to be openable/closable between the double-folding state and the flat plate-like opening state.

IV. Opening/Closing Operation of the Portable Information Device

The following describes the opening/closing operation of the portable information device 10. FIG. 6A is a side cross-sectional view of a positional relationship between the support plates 18A and 18B and the hinge mechanisms 19 when the chassis members 12A and 12B are open. FIG. 6B is a side cross-sectional view illustrating a state during closing of the chassis members 12A and 12B from the state of FIG. 6A. FIG. 6C is a side cross-sectional view illustrating the state after folding the chassis members 12A and 12B double from the state of FIG. 6B.

The portable information device 10 of this embodiment is configured so that the axial centers of the hinge shafts 36a to 36d are disposed on the same plane in the usage mode of opening the chassis members 12A and 12B like a flat plate as illustrated in FIG. 6A, and the surface of the display 16 coincides with this position. While the chassis members 12A and 12B are folded from the usage mode, the link members 30 and 31 rotate around the hinge shafts 36a to 36d as illustrated in FIG. 6B to gradually fold the device between the chassis members 12A and 12B. At this time, the display 16 is also folded. Finally, as illustrated in FIG. 6C, the chassis members 12A and 12B are folded double to be a storage mode, and the display 16 is also folded double while having an arc with a predetermined curvature.

During this opening/closing operation, the surface 22aa of the first locking piece 22a projecting from the inner end face 18Aa abuts on the rear face 18Bb of the second support plate 18B in the usage mode of FIG. 6A, and separates from the rear face 18Bb in the storage mode of FIG. 6C. Similarly, the surface 23aa of the second locking piece 23a projecting from the inner end face 18Ba abuts on the rear face 18Ab of the first support plate 18A in the usage mode of FIG. 6A, and separates from the rear face 18Ab in the storage mode of FIG. 6C. That is, when the portable information device 10 is opened from the storage mode of FIG. 6C to the usage mode of FIG. 6A, the surfaces 22aa and 23aa of the locking pieces 22a and 23a abut on the rear faces 18Bb and 18Ab of the opposed support plates 18B and 18A from the below to press the rear faces 18Bb and 18Ab upward. As a result, the forces from the locking pieces 22a and 23a to press the support plates 18B and 18A upward restrain each other, so as to suppress a level difference in the thickness direction between the inner end faces 18Aa and 18Ba of the support plates 18A and 18B to keep the flattening.

V. First and Second Locking Members

The following describes the first locking member 22 and the second locking member 23 in details.

Figure 7A:
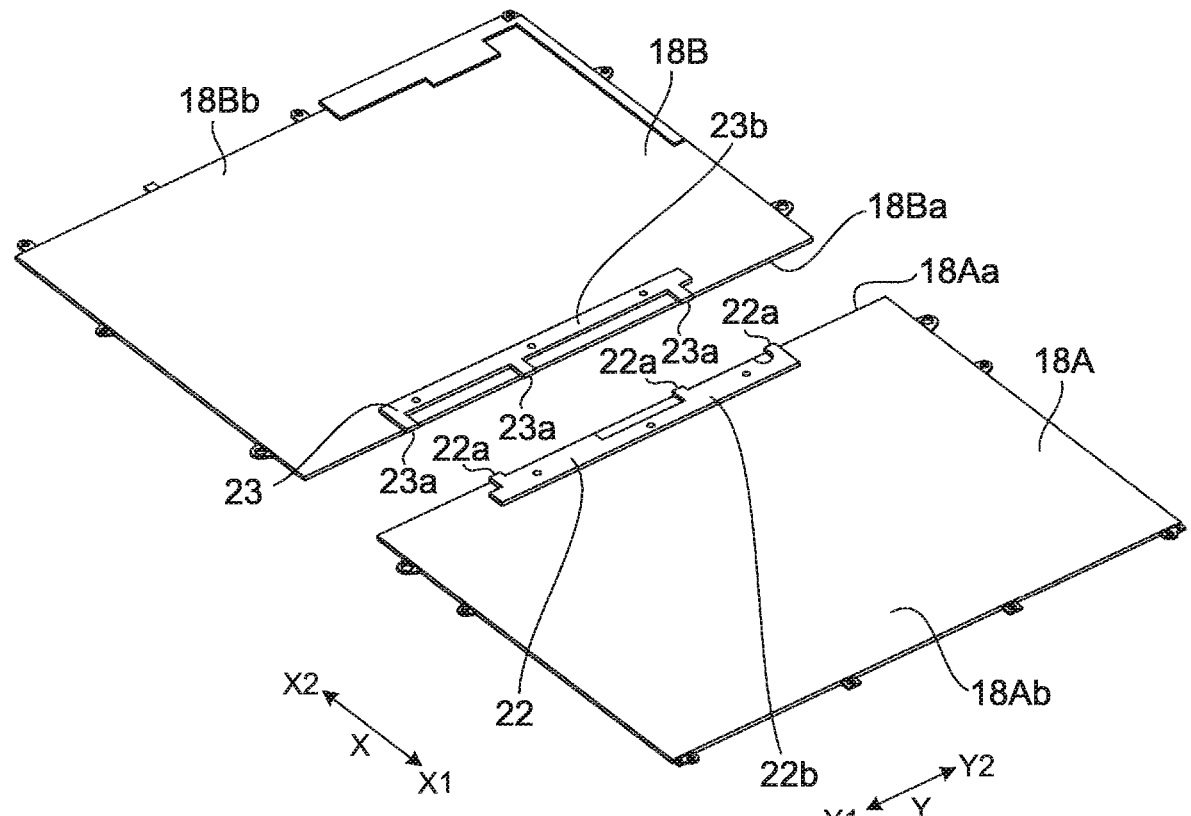
FIG. 7A is a perspective view of the first support plate and the second support plate that are separated from each other.
Figure 7B:
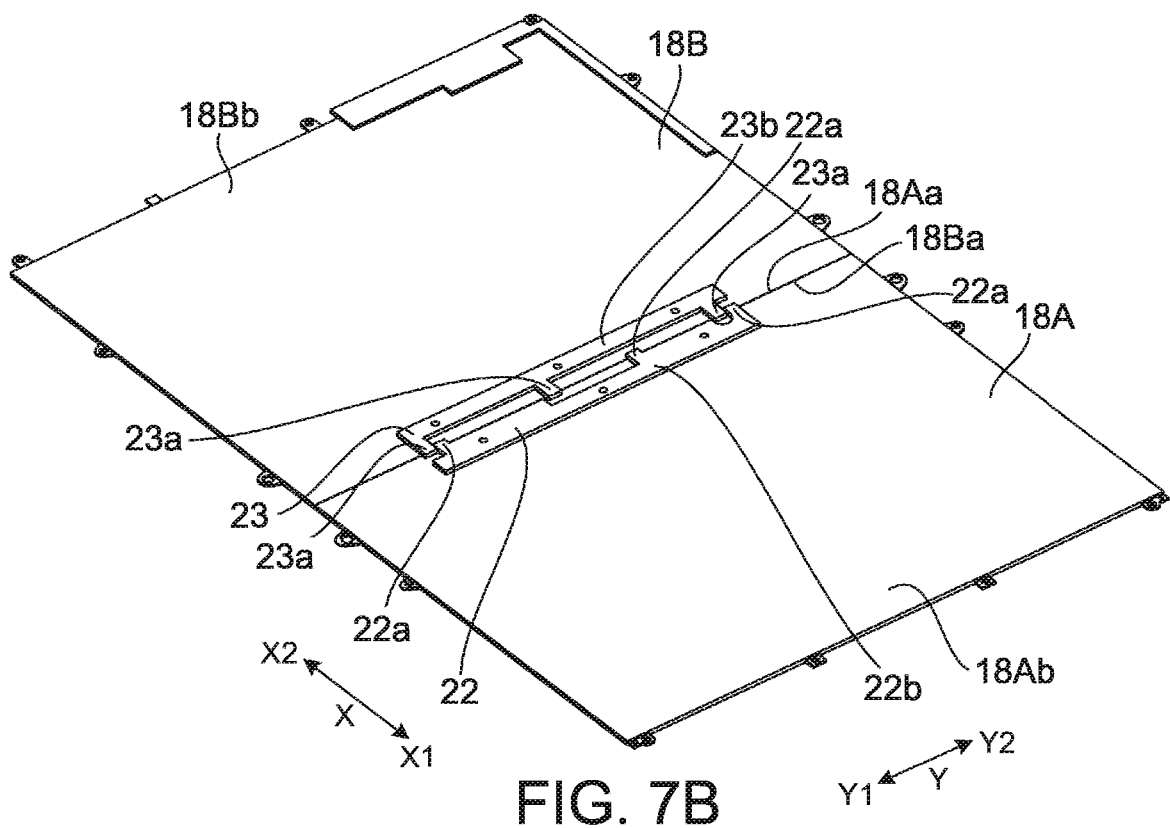
FIG. 7B is a perspective view of the first support plate and the second support plate having their inner end faces that abut on each other.
Figure 8:
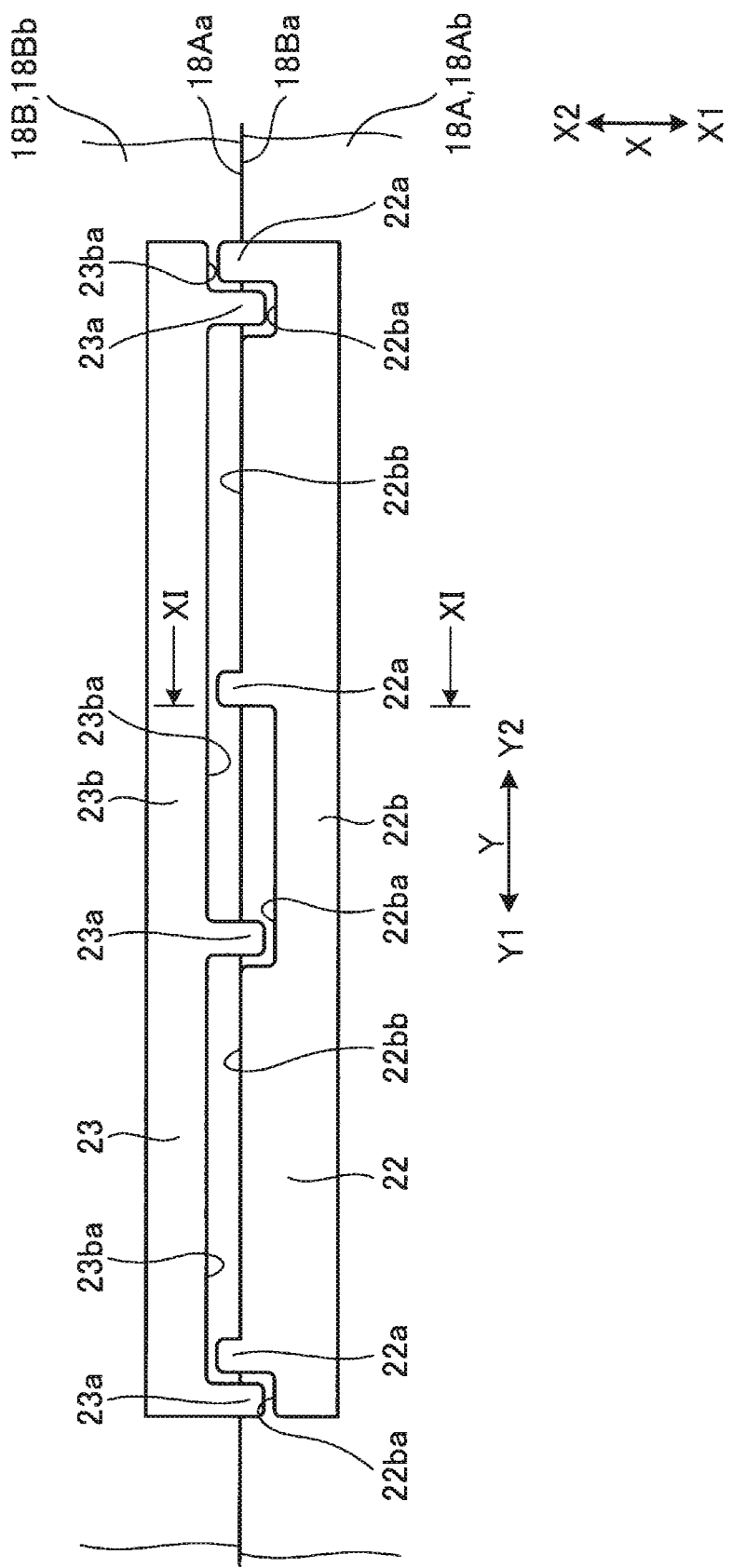
FIG. 8 is a plan view of the first locking member, the second locking member, and their peripheral portions.

FIG. 7A is a perspective view of the first support plate 18A and the second support plate 18B that are separated from each other. FIG. 7B is a perspective view illustrating the first support plate 18A and the second support plate 18B having their inner end faces 18Aa and 18Ba that abut on each other. FIG. 8 is a plan view of the first locking member 22, the second locking member 23, and their peripheral portions.

As illustrated in FIG. 7A, the first locking member 22 extends along the inner end face 18Aa of the rear face 18Ab of the first support plate 18A, and the second locking member 23 extends along the inner end face 18Ba of the rear face 18Bb of the second support plate 18B. The first locking member 22 and the second locking member 23 are placed at substantially centers in the Y direction of the first support plate 18A and the second support plate 18B, respectively, and are opposed in the X direction. The first locking member 22 and the second locking member 23 have the same length in the Y direction, and are slightly shorter than lengths in the X direction of the first support plate 18A and the second support plate 18B, respectively. In the usage mode as described above, the first locking pieces 22a of the first locking member 22 project in the X2 direction from the inner end face 18Aa and support the rear face 18Bb of the second support plate 18B. The second locking pieces 23a of the second locking member 23 project in the X1 direction from the inner end face 18Ba and support the rear face 18Ab of the first support plate 18A.

As illustrated in FIG. 8, the first locking pieces 22a and the second locking pieces 23a are placed alternately in the Y direction. One of the three first locking pieces 22a is placed at the Y2 end, another is placed near the Y1 end, and the remaining one is placed at a position slightly closer to the Y2 end than the center. One of the three second locking pieces 23a is placed at the Y1 end, another is placed near the Y2 end, and the remaining one is placed at a position slightly closer to the Y1 end than the center. At the Y1 end and the Y2 end, the first locking piece 22a and the second locking piece 23a are adjacent to each other, and their mutual effect reliably supports the first support plate 18A and the second support plate 18B particularly at positions close to both ends. Near the center, the first locking piece 22a and the second locking piece 23a are appropriately separated, and have good balance.

The locking members 22 and 23 have locking pieces 22a and 23a protruding in the direction from the single fixing portion 22b and 23b extending in the Y direction. Although this configuration is preferable because the number of components is small, the fixing portions 22b and 23b each may be divided into two or more parts depending on design conditions. Each of the fixing portions 22b, 23b may have a single locking piece 22a, 23a.

The X2 end of the fixing portion 22b includes three cutouts 22ba that are recessed in the X1 direction from the inner end face 18Aa in plan view, and two end faces 22bb that coincide with the inner end face 18Aa in plan view. The cutouts 22ba are portions, into which the three second locking pieces 23a fit. The central cutout of the three cutouts 22ba is slightly longer in the Y direction, and the corresponding second locking piece 23a fits into this cutout at a position closer to the Y1 end.

The X1 end of the fixing portion 23b includes three cutouts 23ba that are recessed in the X2 direction from the inner end face 18Ba in plan view. These cutouts 23ba are portions, into which the three first locking pieces 22a fit. Of the three cutouts 23ba, those close to the Y1 end and in the center are long between the two adjacent second locking pieces 23a, and the remaining one close to the Y2 end is short. The fixing portion 23b does not have a part that coincides with the inner end face 18Ba in plan view. The lengths of the cutouts 22ba and 23ba and the presence or not of the end face 22bb and the corresponding portion depend on design conditions, such as the layout.

Figure 9:
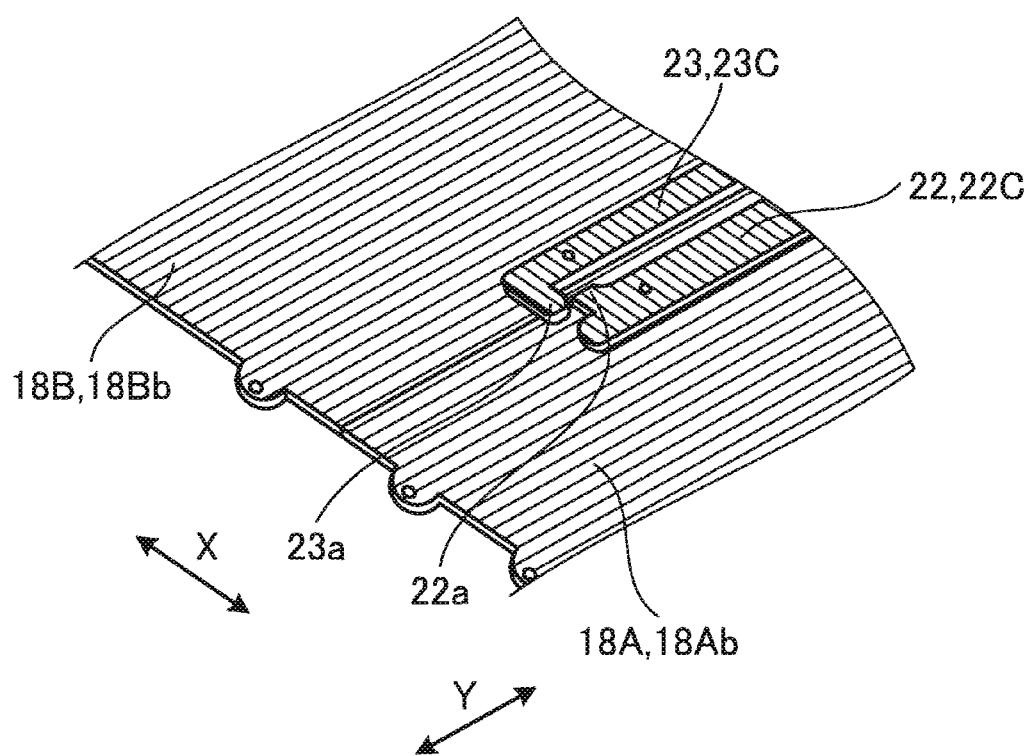
FIG. 9 is a perspective view of the elongation direction of carbon fibers in the first support plate, the second support plate, the first locking member, and the second locking member.

FIG. 9 is a perspective view illustrating the elongation direction of carbon fibers in the first support plate 18A, the second support plate 18B, the first locking member 22, and the second locking member 23. As described above, the first support plate 18A, the second support plate 18B, the first locking member 22 and the second locking member 23 are carbon fiber reinforced resin plates including carbon fibers for reinforcement of the resin. Carbon fiber reinforced resin plates have high strength because layers in which carbon fibers extend in the X direction and layers in which carbon fibers extend in the Y direction orthogonal to the X direction are alternately stacked. Among the multiple layers of the carbon fiber reinforced resin plate, the layer closest to the surface and the layer closest to the rear face particularly contribute to the strength characteristics of the plate.

As illustrated with thin lines in FIG. 9, the carbon fibers of the layer closest to the rear face 18Ab of the first support plate 18A and of the layer closest to the rear face 18Bb of the second support plate 18b extend in the Y direction. In the layers closest to the surfaces on the opposite side, the carbon fibers also extend in the Y direction. The portable information device 10 in use is longer in the Y direction than in the X direction (see FIG. 2). The carbon fibers in the layers closest to the surface layers of the rear faces 18Ab and 18Bb extend in the Y direction, and so the portable information device 10 bends less in the longitudinal Y direction.

As illustrated with thin lines in FIG. 9, the carbon fibers of the layer closest to the rear face 22C of the first locking member 22 and of the layer closest to the rear face 23C of the second locking member 23 extend in the X direction. In the layers closest to the surfaces 22aa, 23aa on the opposite side (see FIG. 12), the carbon fibers also extend in the X direction. That is, the support plates 18A, 18B and the locking members 22, 23 have carbon fibers in the layers closest to the faces abutting on and in contact with each other so that the carbon fibers in these layers extend orthogonally to each other. This configuration mutually complements their directivity of strength. Also in the locking pieces 22a and 23a, the carbon fibers of the layers closest to the rear faces 22c, 23c and the surfaces 22aa, 23aa extend in the X direction (see FIG. 12). When supporting the first support plate 18A and the second support plate 18B, the locking pieces conceptually act like beams and suppress bending.

Figure 10:
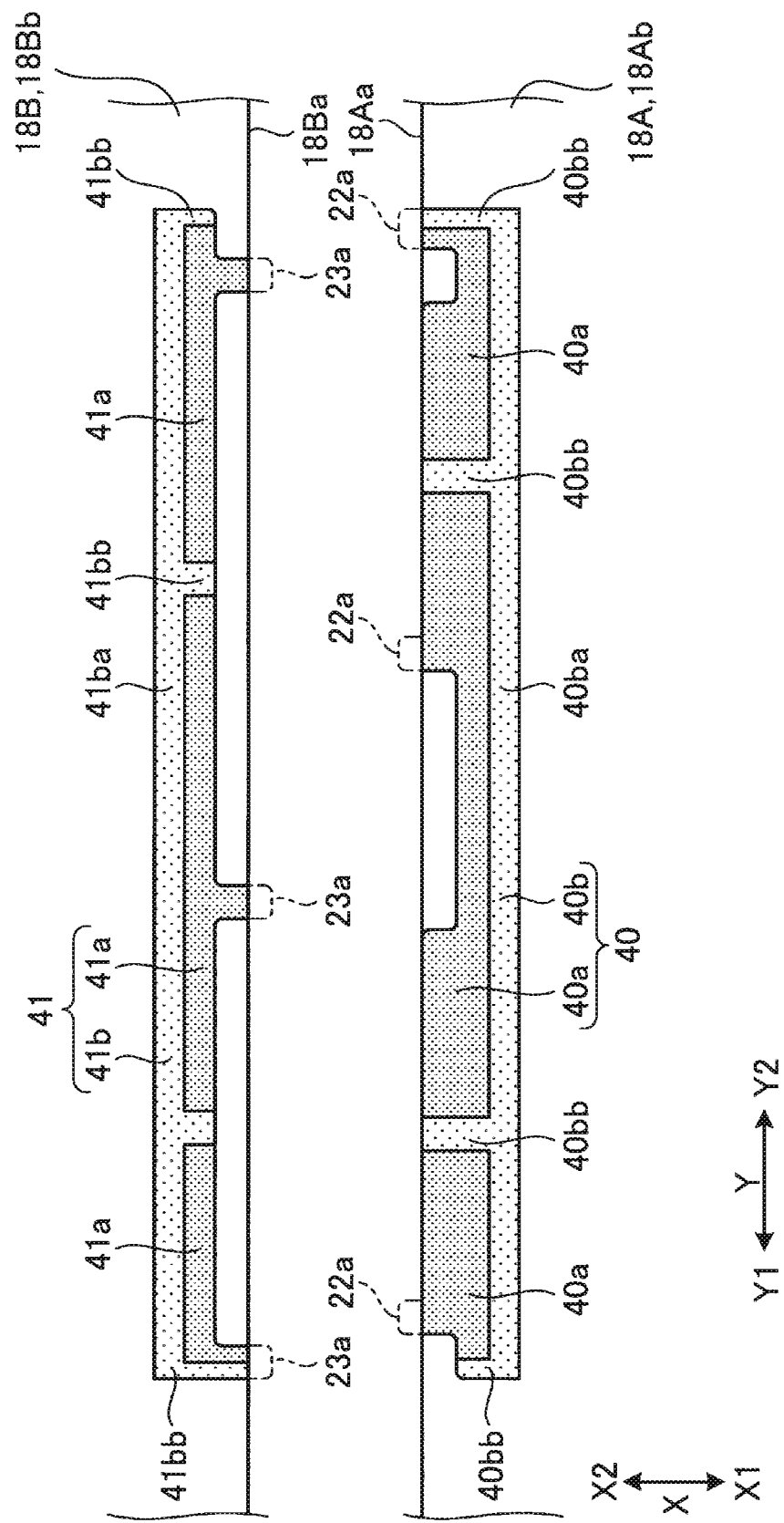
FIG. 10 is an enlarged view of a portion where the inner end faces of the first support p and the second support plate abut on each other.
Figure 11:
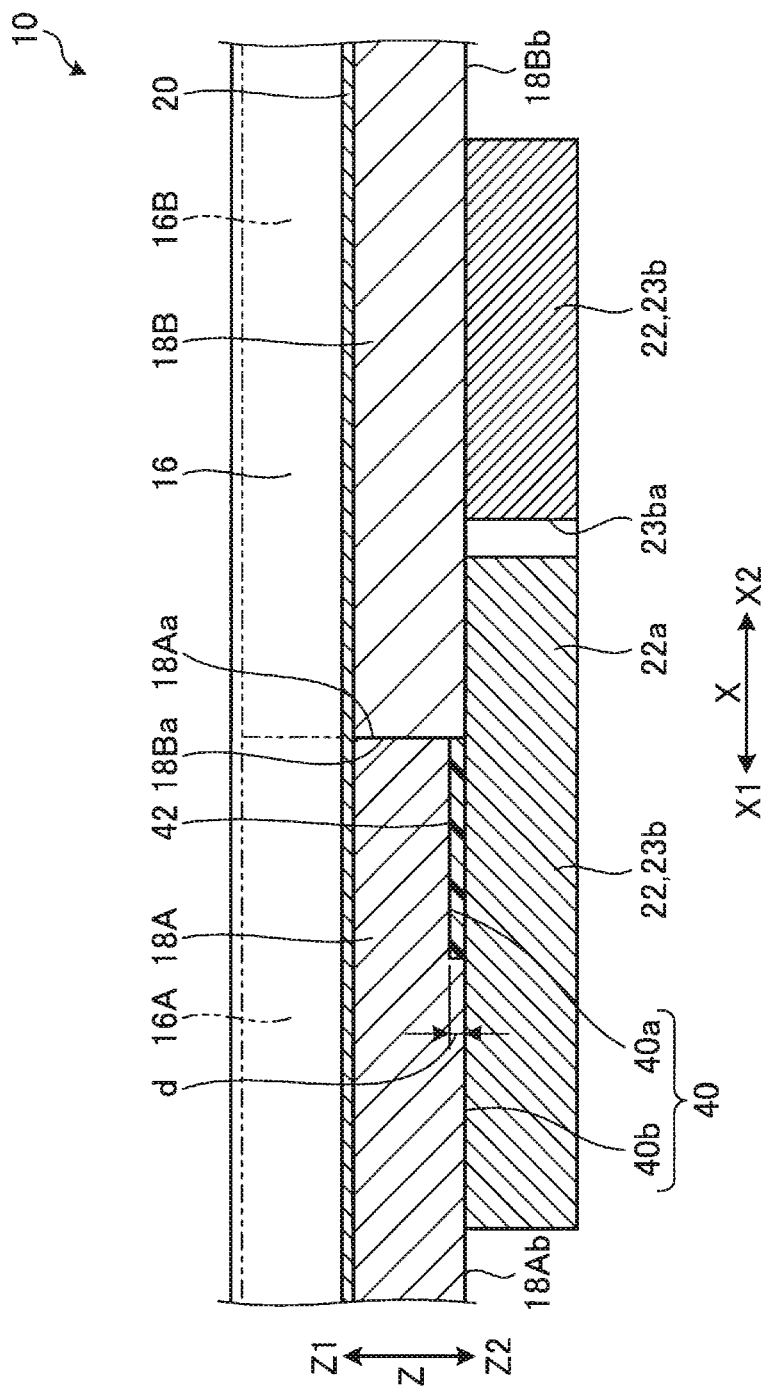
FIG. 11 is a cross-sectional view taken along the line XI-XI in FIG. 8.

FIG. 10 is an enlarged view of a portion where the inner end faces 18Aa and 18Ba of the first support plate 18A and the second support plate 18B abut on each other. FIG. 10 illustrates portions corresponding to the locking pieces 22a and 23a with imaginary lines. Adhesive faces 40a, 41a described later are illustrated with dark dots, and contact faces 40b, 41b described later are illustrated with thin dots for easy understanding. FIG. 11 is a schematic cross-sectional view taken along the line XI-XI in FIG. 8.

As illustrated in FIGS. 10 and 11, a locking member fixing portion 40 extends in the Y direction near the inner end face 18Aa of the rear face 18Ab, and a locking member fixing portion 41 extends in the Y direction near the inner end face 18Ba of the rear face 18Bb. The locking member fixing portion 40 is a region to fix the first locking member 22, and the locking member fixing portion 41 is a region to fix the second locking member 23.

The locking member fixing portion 40 includes a first adhesive face 40a for fixing the first fixing portion 22b of the first locking member 22 with an adhesive, and a first contact face 40b with which the first fixing portion 22b comes into contact. The locking member fixing portion 40 is in the same range as the first fixing portion 22b in plan view. The locking member fixing portion 41 includes a second adhesive face 41a for fixing the second fixing portion 23b of the second locking member 23 with an adhesive, and a second contact face 41b with which the second fixing portion 23b comes into contact. The locking member fixing portion 41 is in the same range as the second fixing portion 23b in plan view.

The contact faces 40b and 41b serve as references for the positions in the height direction (Z direction) and angles of the locking members 22 and 23. The contact faces 40b and 41b have the same height as portions other than the locking member fixing portions 40 and 41 and need not be particularly distinguished, and may be surrounded by a line indicating the region, for example. When the chassis members 12A and 12B are open, i.e., when the portable information device 10 is in the usage mode (see FIG. 2), the contact faces 40b and 41b are flush with the rear face 18Bb of the second support plate 18B.

As illustrated in FIG. 10, the first contact face 40b includes an edge parallel portion 40ba extending in the longitudinal Y direction and multiple edge orthogonal portions 40bb extending in the X direction. The second contact face 41b includes an edge parallel portion 41ba extending in the longitudinal Y direction and multiple edge orthogonal portions 41bb extending in the X direction. The edge parallel portions 40ba and 41ba extend longitudinally in the Y direction on the side of the locking member fixing portions 40, 41 away from the inner end faces 18Aa, 18Ba. The edge orthogonal portions 40bb and 41bb have a relatively small Y-direction width so as to keep a sufficiently long Y-direction width of the adhesive faces 40a and 41a. There are multiple edge orthogonal portions 40bb and 41bb (four in FIG. 10). The edge orthogonal portions 40bb and 41bb are placed including both ends of the locking member fixing portions 40 and 41, and are appropriately separated from each other. Such contact faces 40b and 41b enable the correct positioning and angle determination of the locking members 22 and 23 without inclining them in any direction.

The adhesive faces 40a and 41a are regions of the locking member fixing portions 40 and 41 other than the contact faces 40b and 41b, and are divided into several sections by the contact faces 40b and 41b. FIG. 10 illustrates the adhesive faces 40a and 41a that are each divided into three sections.

As illustrated in FIG. 11, the locking member fixing portion 40 on the rear face 18Ab of the first support plate 18A is fixed to the first fixing portion 22b of the first locking member 22. The contact face 40b on the X1 side of the locking member fixing portion 40 is in contact with the first fixing portion 22b, and the first adhesive face 40a on the X2 side is attached to the first fixing portion 22b with the adhesive 42. The first adhesive face 40a is recessed from the first contact face 40b by the thickness d (also referred to as depth d) of the adhesive 42.

Although not illustrated, the locking member fixing portion 41 on the rear face 18Bb of the second support plate 18B is fixed to the second fixing portion 23b of the second locking member 23. The contact face 41b of the locking member fixing portion 41 is in contact with the second fixing portion 23b, and the second adhesive face 41a on the X1 side is attached to the second fixing portion 23b with the adhesive 42. The second adhesive face 41a is recessed from the second contact face 41b by the depth d.

The support plates 18A and 18B of the present embodiment are separate members so as to be foldable double along with the opening/closing operation of the chassis members 12A and 12B. If a level difference in the thickness direction is generated between the support plate 18A and 18B in the usage mode, the level difference affects the display 16 on the surface of the support plates. As a result, the display 16 in the usage mode may be curved or waved, which causes product defects, such as poor visibility and display defects. If the display 16 is curved, the display 16 may not move along the designed opening/closing trajectory during the opening/closing operation between the usage mode and the storage mode. Then, the display 16 may receive an excessive load particularly at the bent portion and its vicinity, and the display 16 may be broken or be defective.

To avoid this, the portable information device 10 includes the end face positioning portion 24, in which the locking pieces 22a and 23a projecting from the support plates 18A and 18B abut on the opposed rear faces 18Bb and 18Ab to regulate each other for balancing. With this configuration, the portable information device 10 prevents a level difference between the inner end faces 18Aa and 18Ba of the support plates 18A and 18B in the usage mode, and so supports the display 16 stably. As a result, this configuration prevents problems of the display 16. The end face positioning portion may include at least one set of the first locking piece 22a and the second locking piece 23a.

The portable information device 10 includes locking pieces 22a and 23a that are placed in a staggered manner along the inner end faces 18Aa and 18Ba. This prevents a level difference in the extension direction of the inner end faces 18Aa and 18Ba more reliably.

In the portable information device 10, the attachments 25 of the support plates 18A and 18B abut on and are supported by the surfaces 28Aa and 28Ba of the hinge chassis 28A and 28B, respectively. The portable information device 10 may be configured so that the surfaces 28Aa and 28Ba of the hinge chassis 28A and 28B are flush with each other, and this prevents a level difference between both ends in the Y direction of the inner end faces 18Aa and 18Ba of the support plates 18A and 18B. As a result, the portable information device 10 suppresses a level difference between the inner end faces 18Aa and 18Ba in the usage mode more reliably, and so supports the display 16 more stably.

The portable information device 10 is configured so that, in the usage mode of opening the chassis members 12A and 12B like a flat plate, the mutually opposed inner end faces 18Aa and 18Ba of the support plates 18A and 18B abut on each other. This means that the support plates 18A and 18B are opened to be like a single plate. As a result, these support plates support the display 16 more stably. The support plates 18A and 18B do not have a gap between the inner end faces 18Aa and 18Ba in the usage mode of the portable information device 10, and so the rigidity for supporting during a touch operation of the display 16 can also be achieved.

In the portable information device 10, the first adhesive face 40a is recessed by the depth d, and the adhesive 42 intervenes between the first adhesive face 40a and the first fixing portion 22b. This means that the surface of the first locking piece 22a is flush with the rear face 18Ab of the first support plate 18A, and is also flush with the rear face 18Bb of the second support plate 18B in the usage mode of the portable information device 10 to support the rear face 18Bb. This configuration therefore suppresses a level difference in the Z direction between the inner end face 18Aa of the first support plate 18A and the inner end face 18Ba of the second support plate 18B.

The second adhesive face 41a is also recessed by the depth d, and the adhesive 42 intervenes between the second adhesive face 41a and the second fixing portion 23b. This means that the surface of the second locking piece 23a is flush with the rear face 18Bb of the second support plate 18B, and is also flush with the rear face 18Ab of the first support plate 18A in the usage mode of the portable information device 10 to support the rear face 18Ab. This configuration therefore further suppresses a level difference in the Z direction between the inner end face 18Aa of the first support plate 18A and the inner end face 18Ba of the second support plate 18B. This configuration does not generate waviness or bending of the single display 16 supported by the first support plate 18A and the second support plate 18B, and so supports the display 16 stably and improves the visibility. The adhesive 42 applied to the first adhesive face 40a and the adhesive 42 applied to the second adhesive face 41a may be of different types depending on the design conditions.

The number of the display 16 is not limited to one. In another embodiment, two displays 16A and 16B may be disposed while setting the position between the inner end faces 18Aa and 18Ba as boundary as illustrated with the imaginary line in FIG. 11, for example. In this case also, the two displays 16A and 16B are stably supported without a level difference, and especially this configuration is preferable when displaying one image across the two displays 16A to 16B because there is no image distortion. The number of displays may be 3 or more depending on design conditions.

Figure 12:
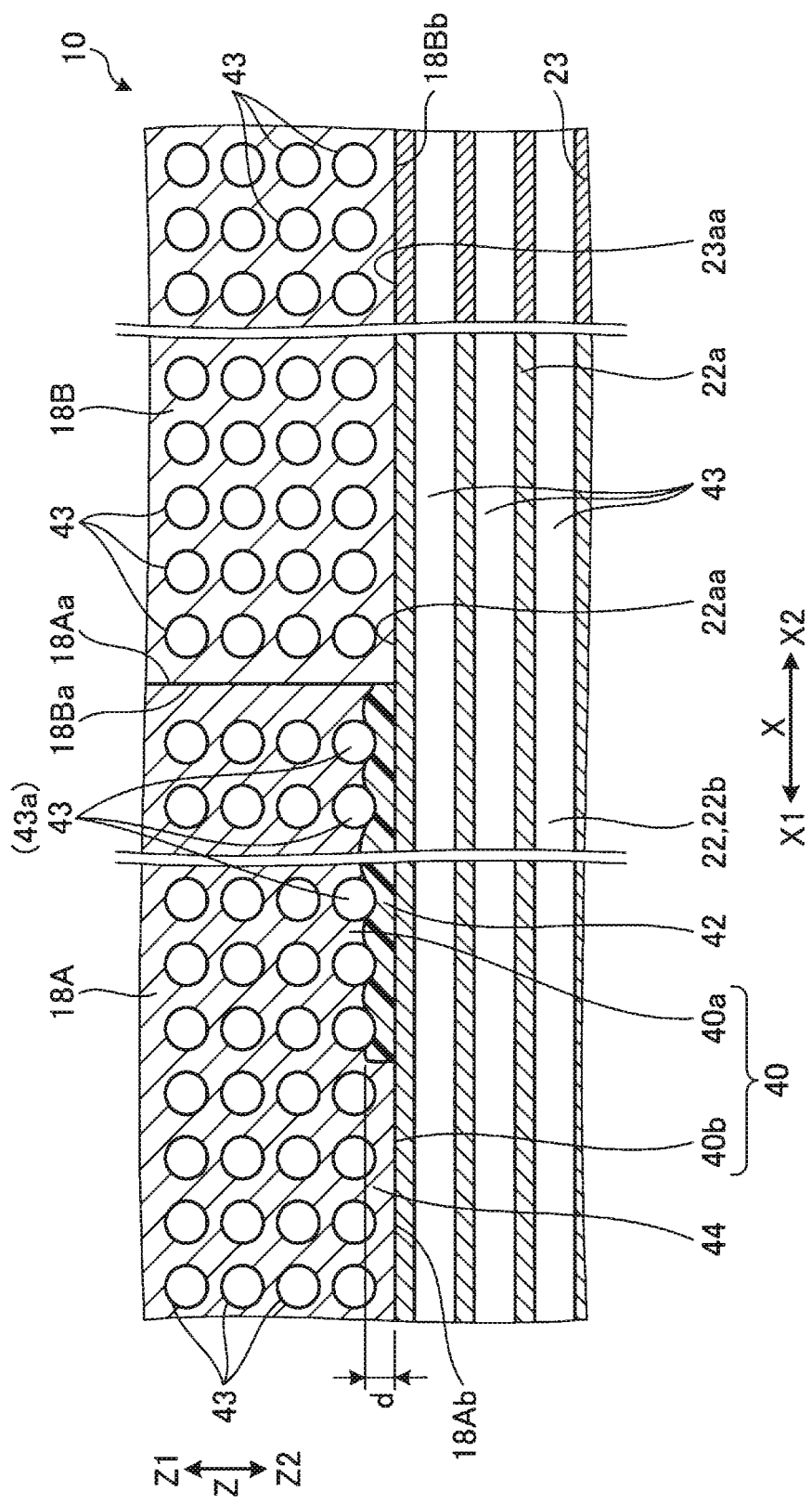
FIG. 12 is an enlarged cross-sectional view of the first adhesive face and its periphery.

FIG. 12 is an enlarged cross-sectional view of the first adhesive face 40a and its periphery. As described above, the carbon fibers 43 of the layer closest to the rear face 18Ab of the first support plate 18A and of the layer closest to the rear face 18Bb of the second support plate 18b extend in the Y direction. In the layer closest to the surface 22aa of the first locking member 22, the carbon fibers 43 extend in the X direction.

If the depth d of the first adhesive face 40a is too shallow, the amount of the adhesive 42 will be insufficient, and if it is too deep, the carbon fibers 43 will be removed. In the portable information device 10, the depth d corresponds to the thickness of surface layer resin 44 in the carbon fiber reinforced resin plate. That is, the first adhesive face 40a in the first support plate 18A has the depth d that is set so as not to remove the portion of the carbon fiber 43, which is closest to the rear face 18Ab and is indicated with reference numeral 43a, and so that an appropriate amount of the adhesive 42 is applicable there. The portion of the carbon fibers 43 near the surface layer indicated with reference numeral 43a largely contributes to the strength, and the first support plate 18A without removing this portion maintains a suitable strength. Although not illustrated, the second adhesive face 41a in the second support plate 18B also has the depth d that is set so as not to remove the portion of the carbon fibers 43, which is closest to the rear face 18Bb, and so the second support plate 18B maintains a suitable strength.

In one example, the first adhesive face 40a and the second adhesive face 41a are formed by irradiating the first support plate 18A and the second support plate 18B with laser. The laser output intensity, the irradiation time, and the like can be adjusted to process the adhesive faces 40a and 41a to have an accurate depth d. The type of laser is $CO_2$ laser, for example. $CO_2$ laser enables rapid processing while finely adjusting the output even when the adhesive faces 40a and 41a extend in a relatively wide range. For the first contact face 40b and the second contact face 41b, any special processing for the first support plate 18A and the second support plate 18B is not required.

The depth d of the adhesive faces 40a, 41a is allowed to have some dimensional deviation within the range of accuracy of the processing method, and therefore some carbon fibers 43 may be removed to an extent that the strength is not significantly affected. A part of the surface layer resin 44 near the carbon fibers 43 may remain after the processing. That is, the depth d of the adhesive faces 40a and 41a may be such that the surface layer resin 44 is substantially removed within the range of processing accuracy.

Figure 13:
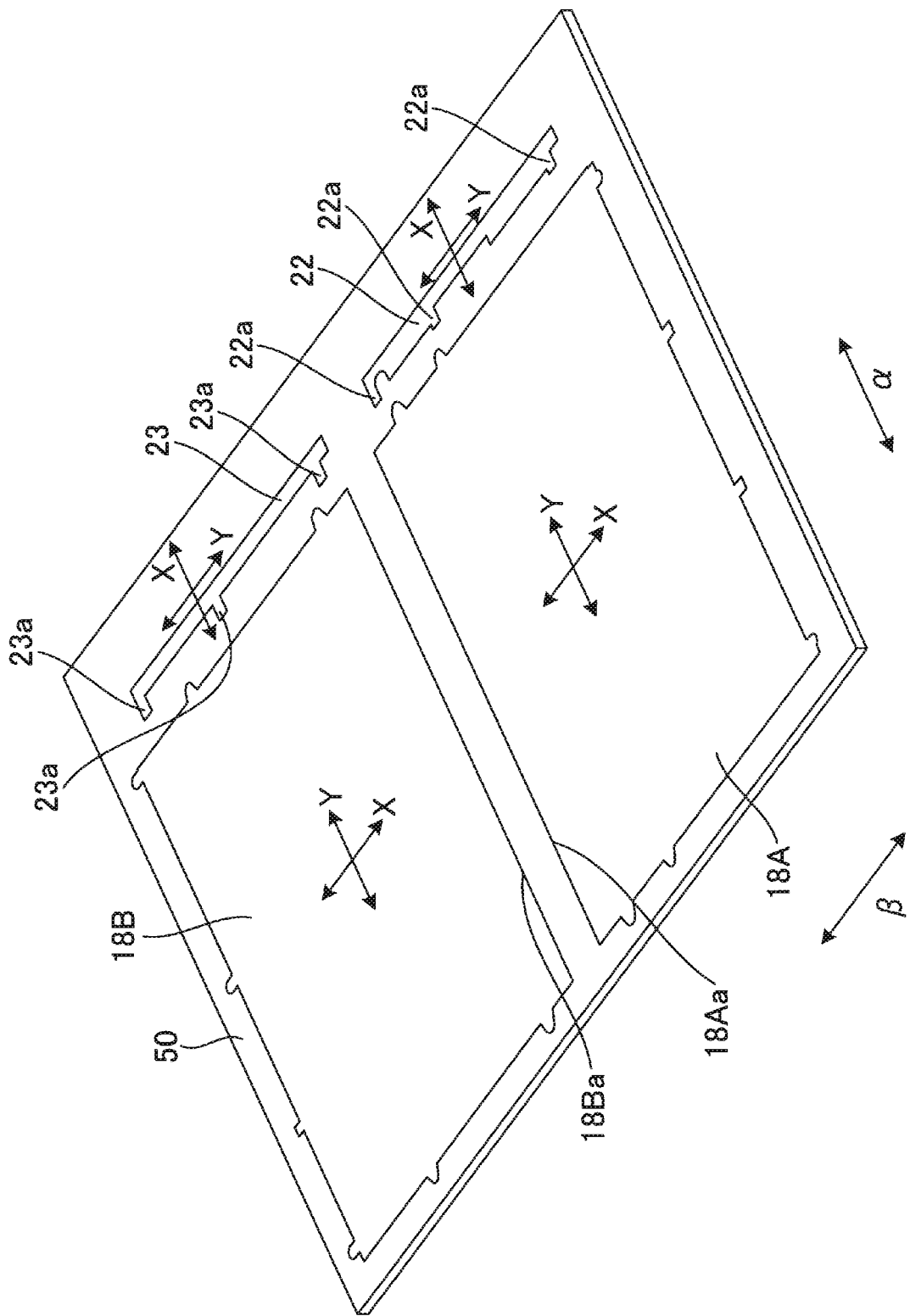
FIG. 13 is a perspective view of a base material of the first support plate, the second support plate, the first locking member and the second locking member.

FIG. 13 is a perspective view of a base material 50 of the first support plate 18A, the second support plate 18B, the first locking member 22 and the second locking member 23. As illustrated in FIG. 13, the first support plate 18A, the second support plate 18B, the first locking member 22, and the second locking member 23 are cut out from one base material 50 by laser or the like. Carbon fibers of the layer closest to the surface and the rear face of the base material 50 extend in the arrow α direction. In the base material 50, the first support plate 18A and the second support plate 18B are arranged in parallel in the arrow β direction. The arrow α direction and the arrow β direction are orthogonal to each other. The first locking member 22 and the second locking member 23 are arranged in parallel in the arrow β direction. The lengths of the locking members 22 and 23 in the Y direction are slightly shorter than the lengths of the support plates 18A and 18B in the X direction, and so the locking members can be arranged in parallel in the β direction. The first support plate 18A and the first locking member 22 are parallel in the α direction, and the second support plate 18B and the second locking member 23 are parallel in the α direction. The first support plate 18A and the second locking member 23 may be parallel in the α direction, and the second support plate 18B and the first locking member 22 may be parallel in the α direction.

The X direction of the support plates 18A and 18B coincides with the β direction of the base material 50, and the Y direction coincides with the α direction. The X direction of the locking members 22 and 23 coincides with the α direction of the base material 50, and the Y direction coincides with the β direction. In other words, the support plates 18A and 18B and the locking members 22 and 23 are arranged in the base material 50 so that the extending direction of the inner end faces 18Aa, 18Ba of the support plates 18A, 18B (Y direction) and the protruding direction of the locking pieces 22a, 23a of the locking members 22, 23 (X direction) are in the same direction (α direction).

When the support plates 18A and 18B are cut out from the single base material 50 in this manner, the difference in plate thickness between them can be suppressed as much as possible. The carbon fibers 43 (see FIG. 12) of the layers closest to the surface and the rear face of the support plates 18A and 18B extend in the Y direction, and the carbon fibers 43 of the layers closest to the surface and the rear face of the locking members 22 and 23 extend in the X direction. That is, the carbon fibers 43 in the layers closest to the joint faces of the support plates 18A, 18B and the locking members 22, 23 extend in the directions orthogonal to each other, and so the strength improves. The processing for forming the adhesive faces 40a, 41a of the support plates 18A, 18B may be performed before cutting out the support plates 18A, 18B from the base material 50 or after cutting out. The type of laser that cuts out the support plates 18A and 18B and the locking members 22 and 23 from the base material 50 and the type of laser that forms the adhesive faces 40a and 41a may be the same or different.

Figure 14:
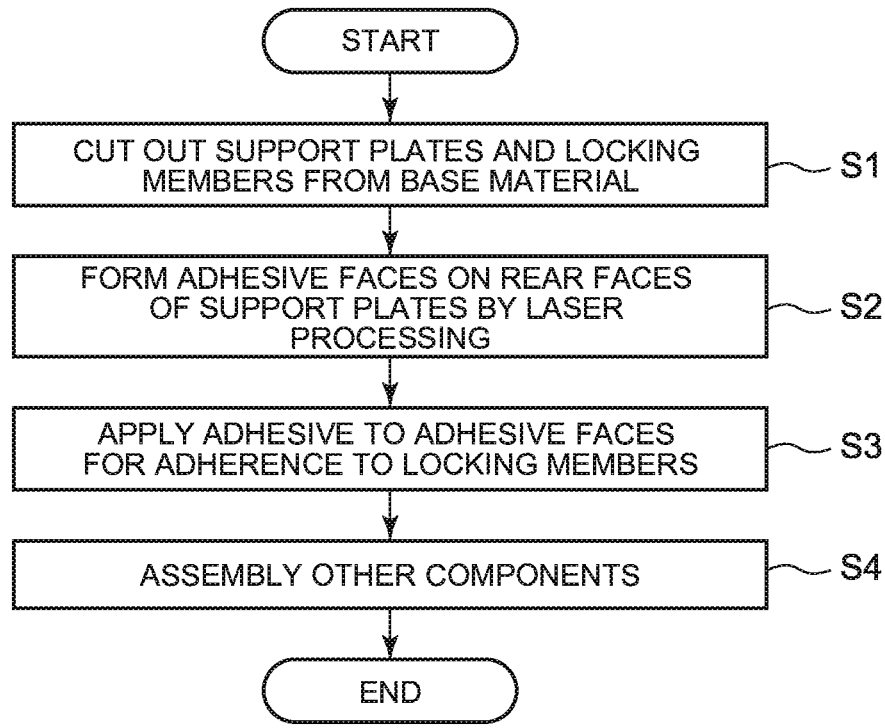
FIG. 14 is a flow chart of a method for manufacturing the portable information device of FIG. 1.

FIG. 14 is a flow chart of a method for manufacturing the portable information device 10. First, in step S1, the support plates 18A and 18B and the locking members 22 and 23 are cut out from the base material 50 by laser. In step S2, the adhesive faces 40a, 41a are formed on the rear faces 18Ab, 18Bb of the support plates 18A, 18B by laser processing. At this time, the adhesive faces 40a and 41a are formed to be recessed from the contact faces 40b and 41b, respectively, by the thickness of the adhesive. In step S3, the adhesive 42 is applied to the adhesive faces 40a, 41a for adherence to the locking members 22, 23. At this time, the locking members 22 and 23 adhere to the adhesive faces 40a and 41a while being in contact with the contact faces 40b and 41b. Then, in step S4, the support plates 18A and 18B are assembled with other components, including the chassis members 12A and 12B, the display 16, the hinges 19, to manufacture the portable information device 10.

Figure 15:
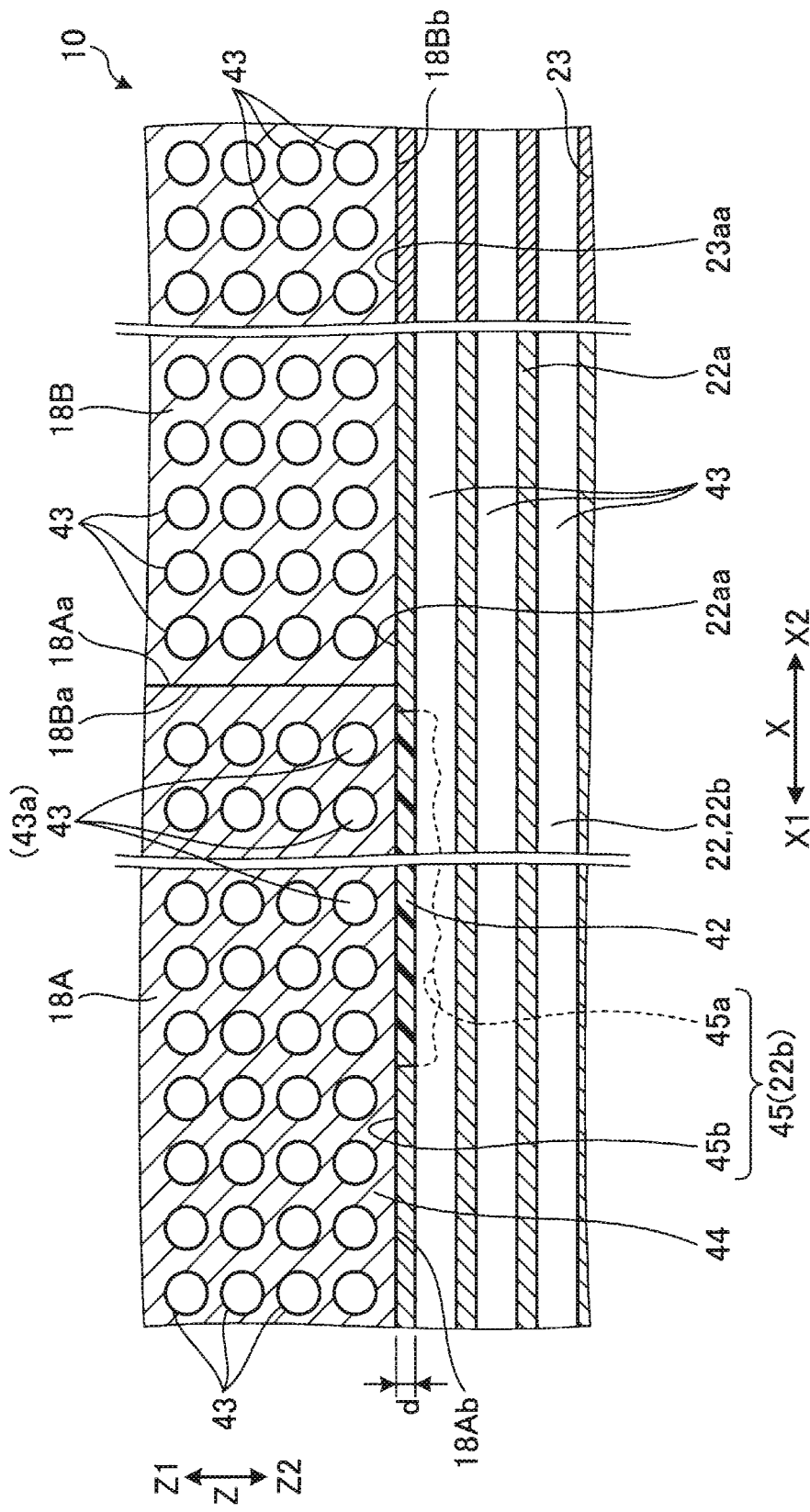
FIG. 15 is an enlarged cross-sectional view of the first adhesive face of the first locking member and its periphery in the portable information device, according to a modified example.

FIG. 15 is an enlarged cross-sectional view of a first adhesive face 40a of a first locking member 22 and its periphery in a portable information device 10A according to a modified example. The first locking member 22 in the portable information device 10A includes a first fixing portion 45. The first fixing portion 45 corresponds to the above-mentioned first fixing portion 22b. The first support plate 18A in the portable information device 10A does not include the first adhesive face 40a (see FIG. 12) that is a recess.

The first fixing portion 45 includes a first adhesive face 45a for fixing the locking member fixing portion 40 of the first support plate 18A with an adhesive, and a first contact face 45b with which the locking member fixing portion 40 comes into contact. The first fixing portion 45 is in the same range as the locking member fixing portion 40 in plan view. The first adhesive face 45a is formed in a range substantially corresponding to the above-mentioned first adhesive face 40a (see FIG. 10) in plan view. The first contact face 45b is formed in a range substantially corresponding to the above-mentioned first contact face 40b (see FIG. 10) in plan view.

The first adhesive face 45a is recessed from the first contact face 45b by a depth d. The depth d of the first adhesive face 45a corresponds to the thickness of surface layer resin 44 in the carbon fiber reinforced resin plate.

Although not illustrated, a second locking member 23 in the portable information device 10A includes a second fixing portion corresponding to the above-mentioned first fixing portion 23b. The second support plate 18B in the portable information device 10A does not include the second adhesive face 41a as a recess. The second fixing portion includes a second adhesive face for fixing the locking member fixing portion 41 of the second support plate 18B with an adhesive, and a second contact face with which the locking member fixing portion 41 comes into contact. The second adhesive face is recessed from the second contact face by the depth d.

That is, the adhesive face with the adhesive 42 applied and recessed by the thickness d may be disposed on the support plates 18A and 18B like the portable information device 10 described above, or may be disposed on the locking members 22 and 23 like the portable information device 10A of the modified example. In other words, one of the support plates 18A, 18B and the locking members 22, 23 may include a contact face with which the other member comes into contact, and an adhesive face for fixing the other member with the adhesive 42, and the adhesive face may be recessed by the thickness d of the adhesive 42 from the contact face.

The above describes the portable information devices 10, 10A that are foldable into half like a book as an example. Other than the configuration in which the chassis members of the same shape are folded double, the present invention is applicable to various configurations including: a double door configuration in which small chassis members are foldably connected to the left and right edges of a large chassis member; an S-shaped folding configuration in which chassis members with different folding directions are connected to the left and right edges of a single chassis member; and a J-shaped folding configuration in which a small chassis member is foldably connected to one of the left and right edges of a large chassis member. The number of connected chassis members may be four or more.

As has been described, the present invention provides a portable information device capable of supporting the display in a stable manner.

While the invention has been particularly shown and described with reference to a preferred embodiment, it will be understood by those skilled in the art that various changes in form and detail may be made therein without departing from the spirit and scope of the invention.

What is claimed is:

1. A portable information device comprising:
    a first chassis member;
    a second chassis member rotatably connected to said first chassis member;
    a display located between said first and second chassis members;
    a first support plate disposed above an inner face of said first chassis member to support said display on said first chassis member;
    a second support plate disposed above the inner face of said second chassis member to support said display on said second chassis member; and
    a first locking member including a first fixing portion fixed to a rear face of said first support plate with an adhesive, and a first locking piece projecting from one end face of said first support plate, wherein said first locking piece being come in contact with and separate from a rear face of said second support plate when said first and second chassis members are opened and closed, wherein one of said first support plate and said first locking member includes:
        a first contact face with which a part of the other comes in contact, wherein said first contact face includes:
            an edge parallel portion in said first fixing portion, said edge parallel portion extending in a direction along said one end face of said first support plate;
            an edge orthogonal portion extending in a direction orthogonal to said direction along said one end face of said first support plate; and
        a first adhesive face to which a part of the other is fixed with said adhesive, wherein said first adhesive face is recessed from said first contact face by a thickness of said adhesive.

2. The portable information device of claim 1, further comprising a second locking member having a second fixing portion fixed to said rear face of said second support plate with an adhesive, and at least one second locking piece projecting from one end face of said second support plate, said at least one second locking piece being come in contact with and separate from said rear face of said first support plate when said first chassis member and said second chassis member are opened and closed.

3. The portable information device of claim 1, wherein one of said second support plate and said second locking member includes:
    a second contact face with which a part of said other comes in contact; and
    a second adhesive face to which a part of said other is fixed with said adhesive, said second adhesive face is recessed from said second contact face by a thickness of said adhesive, and
    said at least one first locking piece includes a plurality of first locking pieces that are disposed along said one end face of said first support plate, and said at least one second locking pieces includes a plurality of second locking pieces that protrude in directions opposed to said first locking pieces in a mutually staggered manner along said one end face of said second support plate.

4. The portable information device of claim 1, wherein of said first support plate and said first locking member, said member having said first contact face and said first adhesive face is a carbon fiber reinforced resin plate.

5. The portable information device of claim 4, wherein a depth of said recess of said first adhesive face relative to said first contact face is equivalent to a thickness of a surface layer resin in said carbon fiber reinforced resin plate.

6. The portable information device of claim 1, wherein said first support plate is a carbon fiber reinforced resin plate, and carbon fibers in a carbon fiber layer closest to a face opposed to said first locking member is directed along said one end face of said first support plate.

7. The portable information device of claim 6, wherein said first locking member is a fiber reinforced resin plate, and carbon fibers in a carbon fiber layer closest to a face opposed to said first support plate is directed orthogonal to a direction of said one end face of said first support plate.

8. The portable information device of claim 1, wherein when said first chassis member and said second chassis member are opened to a flat plate shape, said one end face of said first support plate abuts on said one end face of said second support plate.

9. The portable information device of claim 1, wherein said number of said display is one, and said display is supported from said first support plate to said second support plate.

* * * * *